US009880939B2

(12) United States Patent
Watanabe et al.

(10) Patent No.: US 9,880,939 B2
(45) Date of Patent: Jan. 30, 2018

(54) MEMORY SYSTEM AND INFORMATION PROCESSING SYSTEM

(71) Applicant: Toshiba Memory Corporation, Minato-ku (JP)

(72) Inventors: Konosuke Watanabe, Kawasaki (JP); Satoshi Kaburaki, Tokyo (JP); Tetsuhiko Azuma, Tokyo (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 2 days.

(21) Appl. No.: 15/016,818

(22) Filed: Feb. 5, 2016

(65) Prior Publication Data

US 2017/0068621 A1     Mar. 9, 2017

Related U.S. Application Data

(60) Provisional application No. 62/214,610, filed on Sep. 4, 2015.

(51) Int. Cl.
*G06F 12/00* (2006.01)
*G06F 12/0891* (2016.01)
*G06F 12/02* (2006.01)
*G06F 12/1009* (2016.01)

(52) U.S. Cl.
CPC ...... *G06F 12/0891* (2013.01); *G06F 12/0246* (2013.01); *G06F 12/1009* (2013.01); *G06F 2212/1021* (2013.01); *G06F 2212/60* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 5,802,572 A | 9/1998 | Patel et al. | |
| 7,133,975 B1 * | 11/2006 | Isaac | G06F 12/0811 711/141 |
| 2013/0191609 A1 * | 7/2013 | Kunimatsu | G06F 12/10 711/203 |
| 2015/0177986 A1 * | 6/2015 | Kondo | G06F 13/385 711/103 |
| 2015/0199269 A1 | 7/2015 | Bert et al. | |

FOREIGN PATENT DOCUMENTS

| | | |
|---|---|---|
| JP | 5-282208 | 10/1993 |
| JP | 9-259036 | 10/1997 |
| JP | 2007-41813 | 2/2007 |

* cited by examiner

*Primary Examiner* — Daniel Tsui
(74) *Attorney, Agent, or Firm* — Oblon, McClelland, Maier & Neustadt, L.L.P.

(57) ABSTRACT

According to one embodiment, a memory system includes a nonvolatile memory, a device controller, and a tag memory. The device controller stores a part of a logical-to-physical address translation table (L2P table) stored in the nonvolatile memory in a memory of a host as a cache. The tag memory includes a plurality of entries associated with a plurality of cache lines of the cache. Each entry includes a tag indicating which area of the L2P table is stored in a corresponding cache line, and a plurality of bitmap flags indicating whether a plurality of sub-lines included in the corresponding cache line are valid or not.

20 Claims, 16 Drawing Sheets

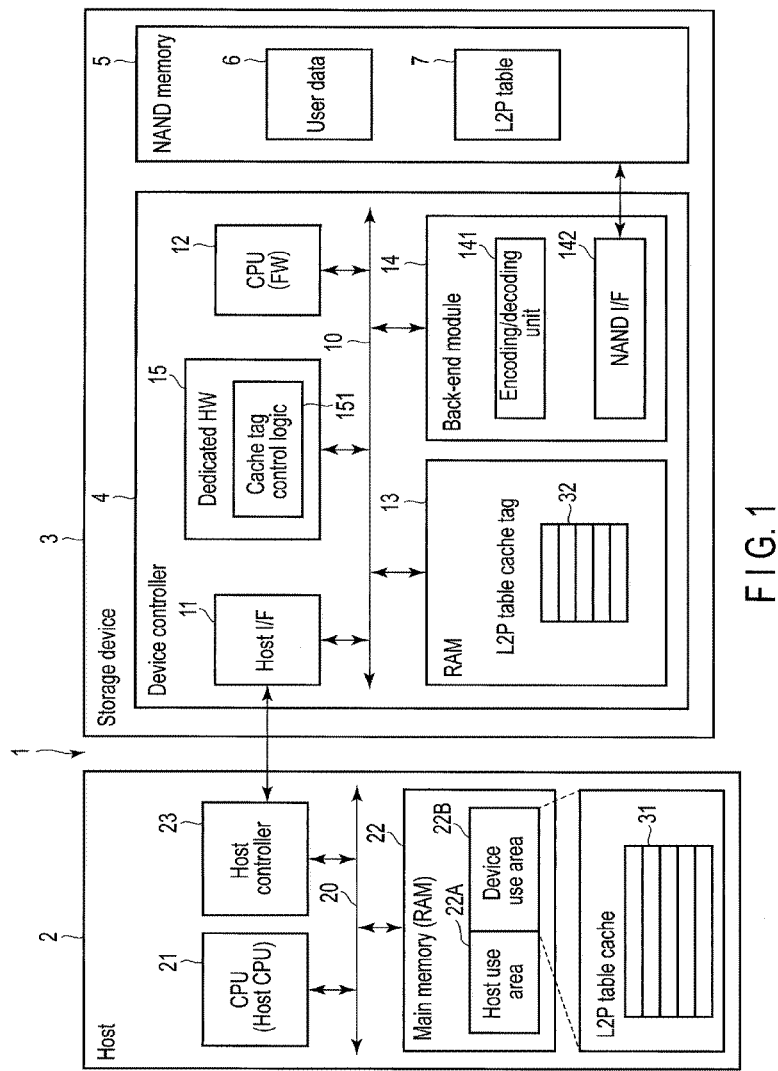
F I G. 1

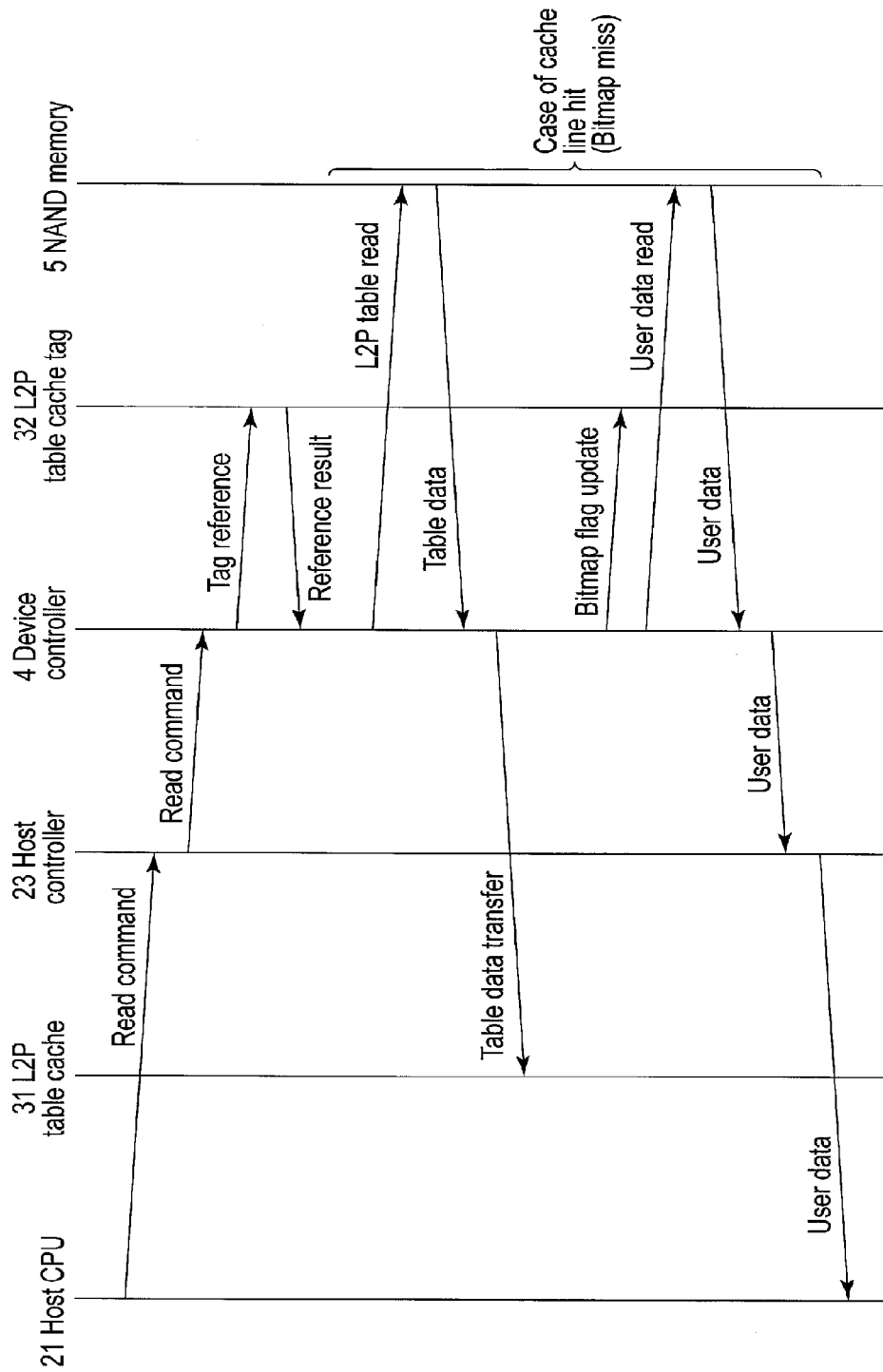
F I G. 8

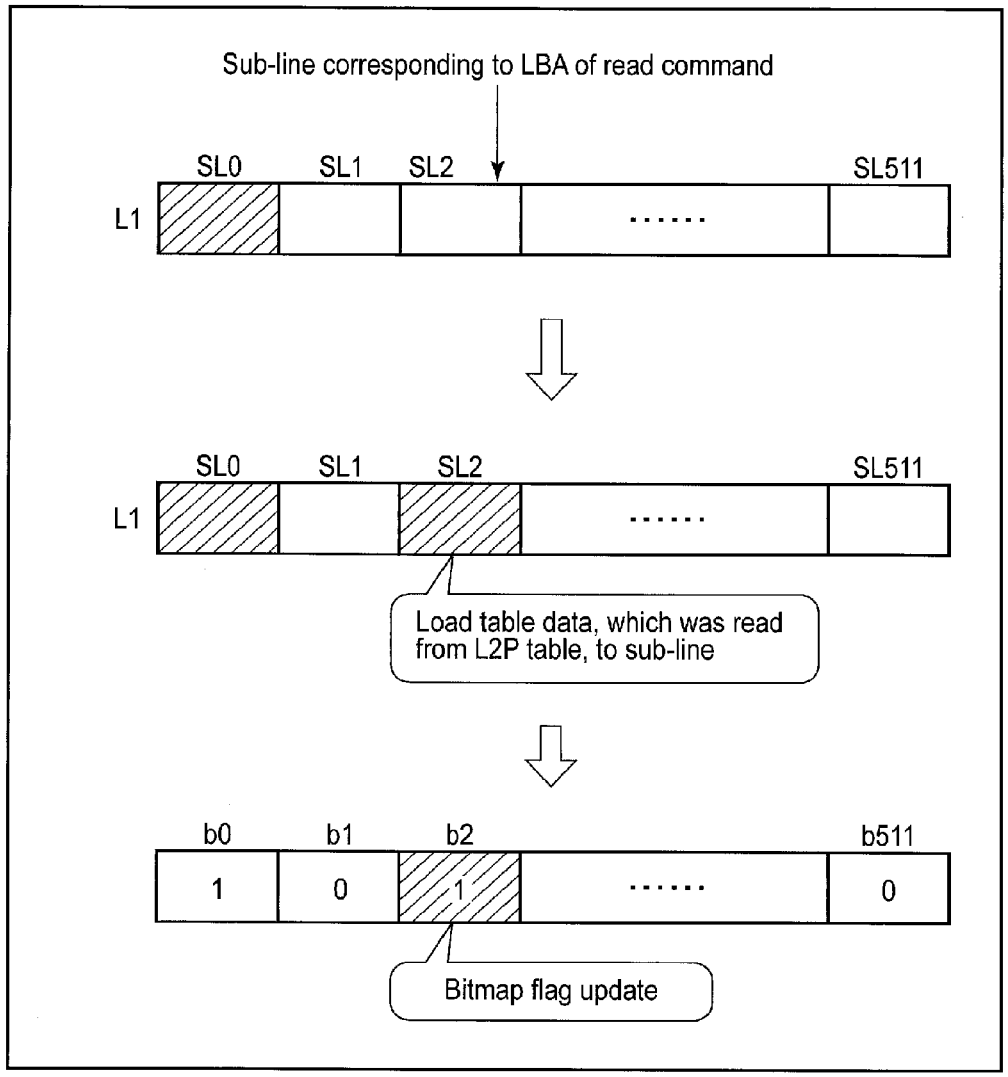
F I G. 9

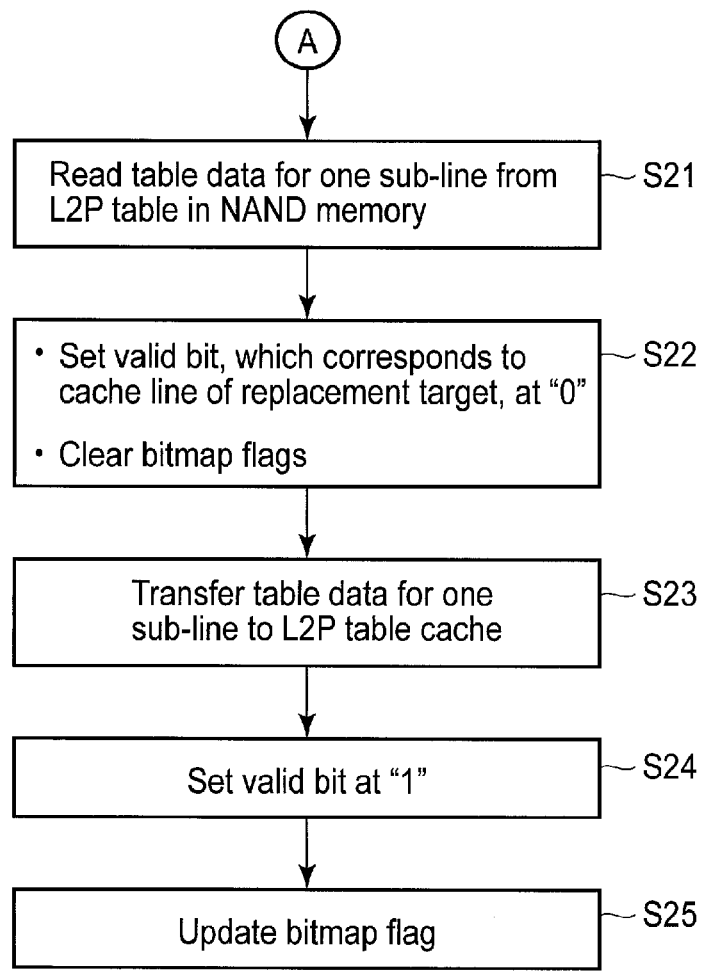
F I G. 13

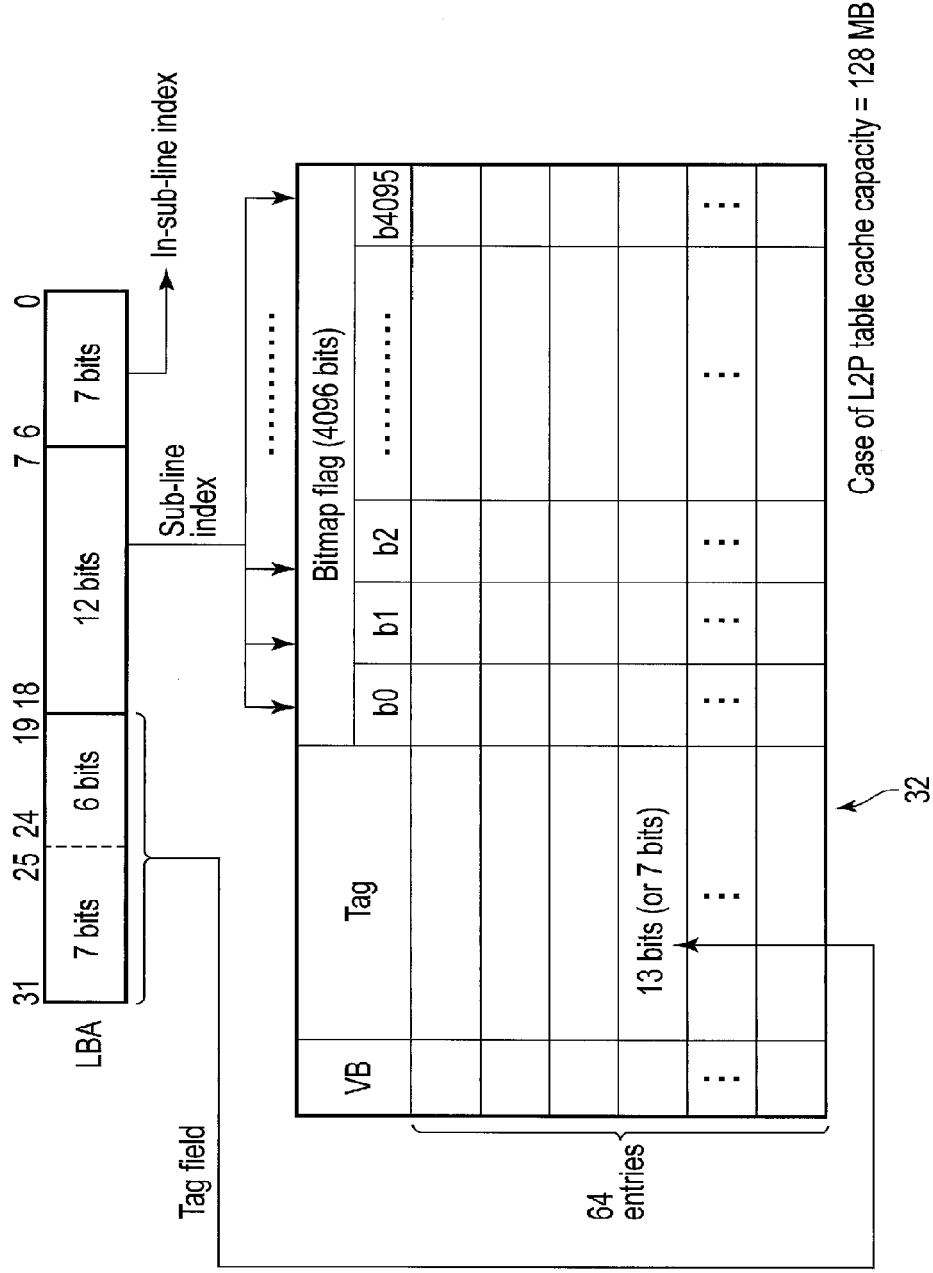
F I G. 14

MEMORY SYSTEM AND INFORMATION PROCESSING SYSTEM

CROSS-REFERENCE TO RELATED APPLICATIONS

This application claims the benefit of U.S. Provisional Application No. 62/214,610, filed Sep. 4, 2015, the entire contents of which are incorporated herein by reference.

FIELD

Embodiments described herein relate generally to a memory system.

BACKGROUND

In recent years, storage devices including nonvolatile memories have widely been used as main storages of various information processing apparatuses.

In addition, a technique has been developed that a memory of a host can be shared and used by the host and a storage device. The performance of the storage device can be improved by storing, on the memory of the host, a part of information that is necessary for the processing of a controller in the storage device.

BRIEF DESCRIPTION OF THE DRAWINGS

FIG. 1 is a block diagram illustrating a configuration of an information processing system including a memory system according to an embodiment.

FIG. 8 is a view for explaining a process sequence of a cache control process which is executed by the memory system according to the embodiment at a time of a cache line hit (bitmap miss).

FIG. 9 is a view for explaining a cache-line-fill operation and a bitmap flag update operation, which are executed in the cache control process of FIG. 8.

FIG. 13 is a flowchart illustrating the other part of the procedure of the cache control process.

FIG. 14 is a view illustrating a configuration example of the L2P table cache in which the number of sub-lines included in the cache line is set at 4096 by adjusting the number of bits for a subline index.

DETAILED DESCRIPTION

Figure 2:
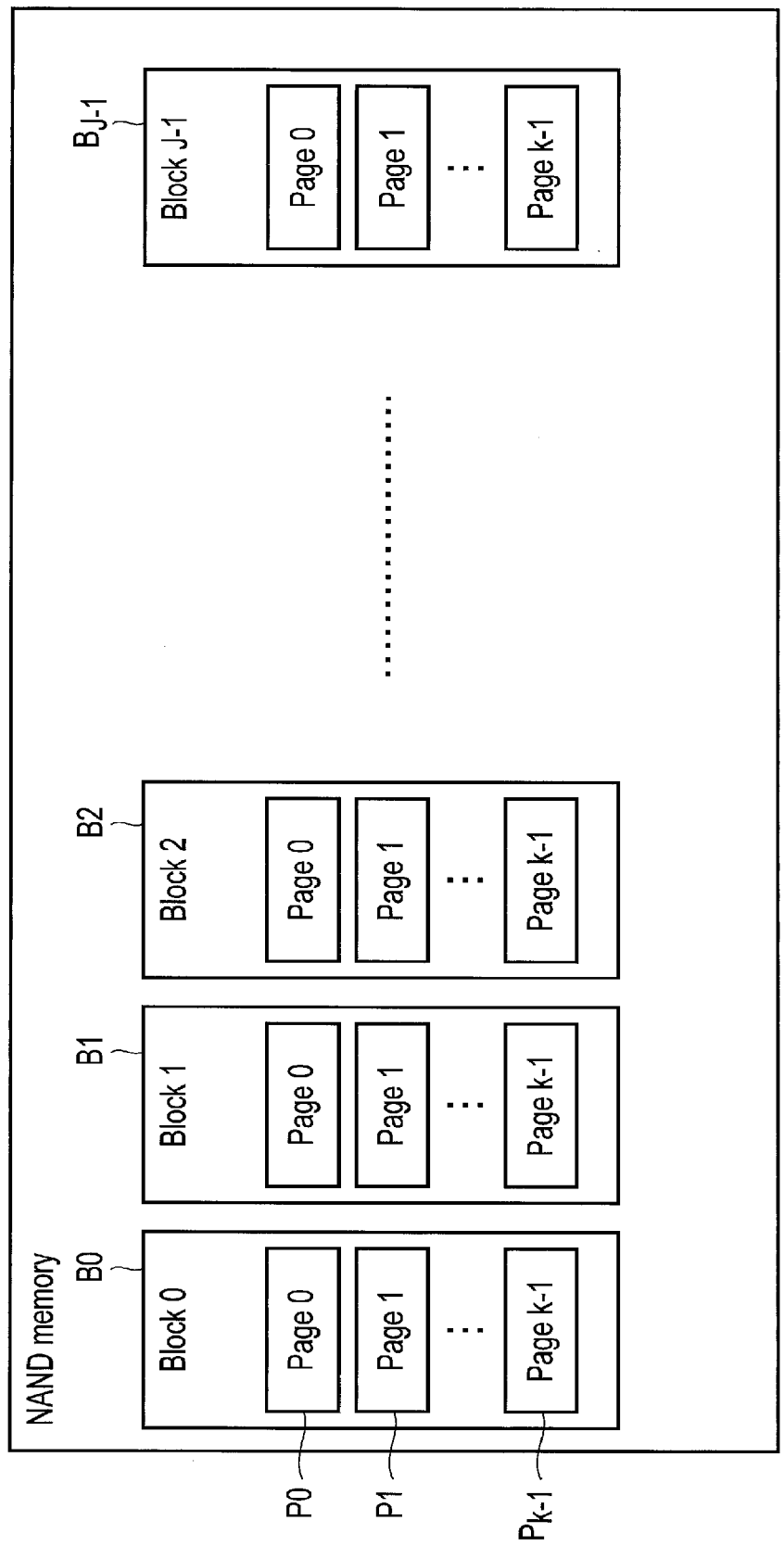
FIG. 2 is a view illustrating a configuration of a nonvolatile memory within the memory system according to the embodiment.

Various embodiments will be described hereinafter with reference to the accompanying drawings.

In general, according to one embodiment, a memory system is connectable to a host. The memory system includes a nonvolatile memory, a device controller, and a tag memory. The device controller is configured to control the nonvolatile memory and to store a part of a logical-to-physical address translation table (L2P table) stored in the nonvolatile memory in a memory of the host as a cache. The tag memory includes a plurality of entries, each of the plurality of entries being associated with each of a plurality of cache lines of the cache, each of the entries including a tag and a plurality of bitmap flags, the tag indicating which area of the L2P table is stored in a corresponding cache line, each of the plurality of bitmap flags corresponding to each of a plurality of sub-lines included in the corresponding cache line, each of the bitmap flags indicating whether a corresponding sub-line is valid or not.

The device controller is configured to determine, by referring to the tag memory, whether a first cache line, which is associated with a tag including an upper bit portion of a first logical address designated by a command received from the host, is present in the cache or not, and whether a first bitmap flag, which is associated with a first sub-line in the first cache line, indicates validity or not. The first sub-line is a sub-line in which first physical address information corresponding to the first logical address is to be stored.

The device controller is configured to read, when the first cache line is present in the cache and the first bitmap flag indicates validity, the first physical address information from the first sub-line of the first cache line.

The device controller is configured to read, when the first cache line is present in the cache and the first bitmap flag indicates invalidity, the first physical address information from the L2P table of the nonvolatile memory, transfer the read first physical address information to the first sub-line of the first cache line to partly fill the first cache line, and update the first bitmap flag to a value indicative of validity.

To begin with, referring to FIG. 1, a description is given of the configuration of an information processing system 1 including a memory system according to an embodiment.

This memory system is a storage device which is configured to write data to a nonvolatile memory and to read data from the nonvolatile memory. This memory system is realized, for example, as a NAND flash technology-based storage device 3. The storage device 3 may be realized, for example, as an embedded storage device such as a universal flash storage (UFS) device.

The information processing system 1 includes a host (host device) 2 and the storage device 3. The host 2 may be a personal computer, a server, a mobile phone or an imaging device, or may be a mobile terminal such as a tablet or a smartphone, or may be a game console, or may be an in-vehicle terminal such as a car navigation system.

The storage device 3 may be used as an external storage device of an information processing apparatus functioning as the host 2. When the storage device 3 is realized as an embedded storage device, the storage device 3 is integrated into the information processing apparatus.

In another embodiment, the storage device 3 may be realized as a solid-state drive (SSD). In this case, the storage device 3 functioning as the SSD may be integrated into the information processing apparatus, or may be connected to the information processing apparatus via a cable or a network.

In the description below, a description is mainly given of the case in which the storage device 3 is realized as an embedded storage device such as a UFS device.

The host 2 and storage device 3 are connected by a communication interface. As the standard of the communication interface, use can be made of, for instance, PCIe (PCI Express), SATA (Serial Advanced Technology Attachment), USB (Universal Serial Bus), SAS (Serial Attached SCSI), MIPI (Mobile Industry Processor Interface), UniPro, etc.

The storage device 3 includes a device controller 4 and a nonvolatile memory (NAND memory) 5. The NAND memory 5 may include a plurality of NAND flash memory chips, although the NAND memory 5 is not restricted to this configuration.

The NAND memory 5 stores user data 6 and a logical-to-physical address translation table (L2P table) 7. The L2P table 7 stores physical addresses corresponding to logical addresses which the host 2 uses in order to access the storage device 3. As the logical address, a logical block address (LBA) is usually used. The physical address is indicative of a physical storage location in the NAND memory 5, where data is stored. The physical address may be expressed by, for example, a combination of a block address, a page address and an in-page address. The L2P table 7 is used in order to translate a logical address to a physical address of the NAND memory 5, where the data designated by the logical address is stored.

The NAND memory 5 includes one or more memory chips each including a memory cell array. The memory cell array includes a plurality of memory cells which are arranged in a matrix. As illustrated in FIG. 2, the memory cell array of the NAND memory 5 includes many NAND blocks (physical blocks) B0~Bj−1. The physical block, B0~Bj−1, functions as an erase unit. In some cases, the physical block is called "block" or "erase block".

The physical block, B0~Bj−1, includes many pages (physical pages). Specifically, each of the physical blocks B0~Bj−1 includes pages P0, P1, . . . , Pk−1. In the NAND memory 5, read of data and write of data are executed in units of a page.

Figure 3:
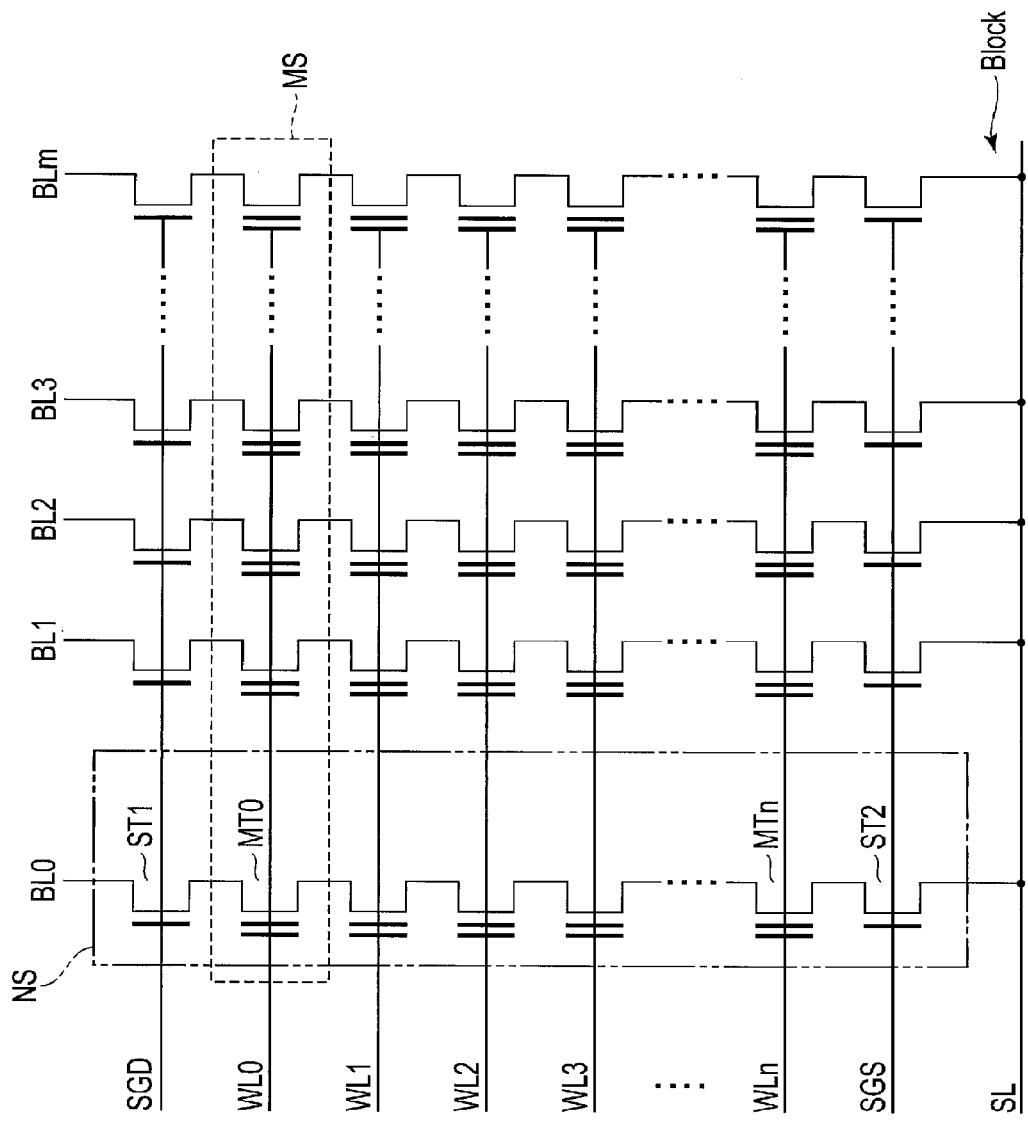
FIG. 3 is a view illustrating a configuration example of a memory cell array within the nonvolatile memory of FIG. 2.

FIG. 3 illustrates a configuration example of the block of the memory cell array. FIG. 3 illustrates only one block of the plural blocks which constitute the memory cell array. The other blocks of the memory cell array have the same configuration as illustrated in FIG. 3. As illustrated in FIG. 3, the block of the memory cell array includes an m+1 number (m is an integer of 0 or more) of NAND strings NS. Each NAND string NS includes an n+1 (n is an integer of 0 or more) of memory cell transistors MT0~MTn, which are connected in series such that a diffusion region (a source region or a drain region) is shared by neighboring memory cell transistors MT, and select transistors ST1 and ST2 which are disposed at both ends of the string of the n+1 memory cell transistors MT0~MTn.

Word lines WL0~WLn are connected, respectively, to control gate electrodes of the memory cell transistors MT0~MTn which constitute the NAND string NS. In addition, memory cell transistors MTi (i=0~n) in the respective NAND strings NS are commonly connected by the same word line WLi (i=0~n). In other words, the control gate electrodes of the memory cell transistors MTi, which are disposed in the same row in the block, are connected to the same word line WLi.

Each memory cell transistor, MT0~MTn, is composed of a field-effect transistor having a multilayer gate structure formed on a semiconductor substrate. Here, the multilayer gate structure includes a charge accumulation layer (floating gate electrode) which is formed on the semiconductor substrate with a gate insulation film being interposed, and a control gate electrode which is formed on this charge accumulation layer with an inter-gate insulation film being interposed. In the memory cell transistor, MT0~MTn, the threshold voltage varies in accordance with the number of electrons which are accumulated in the floating gate electrode, and the memory cell transistor, MT0~MTn, can store data in accordance with a difference of this threshold voltage.

Bit lines BL0 to BLm are connected to the drains of m+1 select transistors ST1 in one block, and a select gate line SGD is commonly connected to the gates thereof. In addition, the source of the select transistor ST1 is connected to the drain of the memory cell transistor MT0. Similarly, a source line SL is commonly connected to the sources of m+1 select transistors ST2 in one block, and a select gate line SGS is commonly connected to the gates thereof. In addition, the drain of the select transistor ST2 is connected to the source of the memory cell transistor MTn.

Each memory cell is connected to a word line and is also connected to a bit line. Each memory cell can be identified by an address which identifies the word line, and an address which identifies the bit line. As described above, the data of the plural memory cells (memory cell transistors MT) in the same block is erased batchwise. On the other hand, read and write of data are executed in units of a page. When each memory cell can store only two values, one page corresponds to one physical sector MS which includes a plurality of memory cells that are connected to one word line.

In the case in which each memory cell can store multi-values, if the memory cell is operated in a single-level cell (SLC) mode, one physical sector MS corresponds to one page. If the memory cell is operated in a multilevel cell (MLC) mode, one physical sector MS corresponds to N pages (N is a natural number of 2 or more). When N=2, one physical sector MS corresponds to two pages. When N=3, one physical sector MS corresponds to three pages.

At the time of a read operation and a program operation, one word line is selected in accordance with a physical address, and one physical sector MS is selected. The switching of a page in the physical sector MS is executed by the physical address.

In FIG. 1, the device controller 4 controls the NAND memory 5 that is the nonvolatile memory. The device controller 4 may function as a flash translation layer (FTL) which is configured to execute data management of the NAND memory 5 and block management of the NAND memory 5.

The data management includes (1) management of mapping information indicative of the relationship between logical addresses (logical block addresses: LBAs) and physical addresses, and (2) a process for hiding a page-unit read/write and a block-unit erase operation. The management of mapping between the LBAs and physical addresses is executed by using the L2P table 7. A physical address corresponding to a certain LBA indicates a storage location in the NAND memory 5, where the data of this LBA was written. Data write to the page is possible only once per erase cycle.

Thus, the device controller 4 maps write (overwrite) to the same LBA to another page on the NAND memory 5. Specifically, the device controller 4 writes data to this another page. Then, the device controller 4 updates the L2P table 7 to associate this LBA with a physical address corresponding to this another page.

The block management includes management of a bad blocks, wear leveling, and garbage collection.

The host 2 sends a read command and a write command to the storage device 3. The read command is a command which requests the storage device 3 to execute data read. The read command includes an LBA (starting LBA) of data that is to be read, and a transfer length. The LBA is expressed by a serial number which is given to a logical sector. The serial number begins from zero. The size of each logical sector is, e.g. 512 bytes.

The device controller 4 reads a part (table data) of the L2P table 7 from the NAND memory 5, and acquires a physical address corresponding to the LBA in the read command by referring to the read table data of the L2P table 7. The read operation of table data from the L2P table 7 is executed in units of a predetermined data size, for example, 512 bytes.

The device controller 4 reads data from a physical storage location of the NAND memory 5, which corresponds to the acquired physical address, and transfers the read data to the host 2.

The write command is a command which requests the storage device 3 to execute data write. The write command includes an LBA (starting LBA) of write data (i.e. data to be written), and a transfer length. The device controller 4 writes write data, which is designated by the starting LBA and transfer length in the write command, to a physical page of a physical block in the NAND memory 5. Further, the device controller 4 updates the L2P table 7, thereby mapping the LBA, which corresponds to the written data, to the physical address corresponding to the physical storage location at which the data was written.

For example, when data, which is designated by a certain LBA(x), was written at a physical address (y) in the NAND memory 5, read-modified-write is executed in order to update the L2P table 7.

In this read-modified-write, the device controller 4 reads table data, which includes the current physical address corresponding to the LBA(x), from the L2P table 7 of the NAND memory 5. This table data may be the above-described data unit of the predetermined data size (e.g. 512 bytes).

The device controller 4 updates a part of the read table data. In the update of the table data, the device controller 4 updates a part of the table data, i.e., the current physical address which corresponds to LBA(x), to the physical address (y). When the physical address is 32 bits, i.e. 4 bytes, only 4 bytes of the 512-byte table data are updated. Then, the device controller 4 writes the updated table data to the NAND memory 5, and updates the L2P table 7.

The device controller 4 can store at least a part of the L2P table 7 as an L2P table cache 31 in a main memory of the host 2.

The main memory 22 is a random access memory such as a DRAM. In addition, the main memory 22 may be, for example, an MRAM (Magnetoresistive Random Access Memory) or a FeRAM (Ferroelectric Random Access Memory). The main memory 22 includes a host use area 22A and a device use area 22B. The host use area 22A is used as a program development area at a time when the host 2 executes an operating system (OS) or a user program, or as a work area at a time when the host 2 executes a program which was developed on this program development area. The device use area 22B is used as a cache area for management information and read/write of the storage device 3. Here, the L2P table cache 31 is taken as an example of the management information which is cached in the device use area 22B. In addition, it is assumed that write data is cached in the device use area 22B. Usually, the capacity of the device use area 22B is much greater than the capacity of a device integrated RAM provided in the storage device 3. Accordingly, by using the device use area 22B of the host 2, the L2P table cache 31 with a large capacity can easily be realized. The device use area 22B can be realized by, for example, a unified memory (UM) area.

The device controller 4 may transfer in advance a copy of a part of the L2P table 7 to the L2P table cache 31.

When physical address information (table data) corresponding to the LBA designated by the host 2 is present in the L2P table cache 31 (cache hit), the device controller 4 reads this physical address information from the L2P table cache 31 of the host 2, instead of reading the L2P table 7 of the NAND memory 5. Thereby, it is possible to reduce the number of times by which the L2P table 7 of the NAND memory 5 is read, when a data read request has been received from the host 2, or in order to execute read-modified-write for updating the L2P table 7. Therefore, the performance of the storage device 3 can be improved.

As the procedure of reading/writing the device use area 22B, various procedures can be utilized. When the device use area 22B is realized as a UM area, the procedure of reading/writing the device use area 22B can be executed based on the standard of Universal Flash Storage Unified Memory Extension.

Next, the configuration of the device controller 4 is described.

The device controller 4 includes a host interface 11, a CPU 12, a RAM 13, a back-end module 14, and a dedicated hardware (HW) 15. The host interface 11, CPU 12, RAM 13, back-end module 14 and dedicated hardware (HW) 15 are interconnected via a bus 10.

The host interface 11 receives various commands, such as a write command and a read command, from the host 2. Further, the host interface 11 can transmit to the host 2 a command for writing the device use area 225 and a command for reading the device use area 22B.

The CPU 12 is a processor configured to control the operation of the entirety of the storage device 3. When the storage device 3 has received power supply, the CPU 12 executes a predetermined process by reading out a predetermined control program (firmware FW), which is stored in a ROM (not shown), onto the RAM 13. The CPU 12 executes, for example, a command process for processing various commands from the host 2, in addition to the above-described process of FTL. The operation of the CPU 12 is controlled by firmware FW that is executed by the CPU 12. A part or all of the above-described command process may be executed by the dedicated hardware 15.

The RAM 13 is a device integrated RAM provided within the storage device 3. The RAM 13 may be integrated into the device controller 4. The RAM 13 may be, for example, a static RAM (SRAM). The RAM 13 is used as a work area of the CPU 12, and predetermined control programs, various tables, etc., which have been loaded, are stored in the RAM 13.

One of typical approaches for improving the performance of the storage device 3 is to provide a large-capacity device integrated RAM, and to place necessary information for processing on this device integrated RAM. However, this approach may become a factor which increases the cost of the storage device 3 (device controller 4), and may become a factor which hinders miniaturization of the device controller 4. In the present embodiment, since the device controller 4 utilizes the device use area 22B of the host 2 as the work memory (L2P table cache in this case) of the device controller 4, the necessary capacity of the device integrated RAM can be decreased.

In this embodiment, the RAM 13 is utilized as an L2P table cache tag 32. The L2P table cache tag 32 is a tag memory for managing the L2P table cache 31. Specifically, the L2P table cache tag 32 stores necessary cache management information for determining a cache hit/miss of the L2P table cache 31. The L2P table cache tag 32 exists not on the device use area 22B, but on the RAM 13 in the device controller 4. The device controller 4 can immediately determine a cache hit/miss of the L2P table cache 31, without accessing the device use area 22B.

Usually, the size of the L2P table 7 is very large. Typically, the size of the L2P table 7 is about $\frac{1}{1000}$ of the capacity of the storage device, that is, the capacity of the NAND memory 5.

For example, when the capacity of the NAND memory 5 is 128 Gbytes, the necessary size of the L2P table 7 is about 128 Mbytes. Accordingly, in order to increase the hit ratio of the L2P table cache 31, the L2P table cache 31 with a large capacity is needed.

When the large-capacity L2P table cache 31 is placed on the device use area 22B, the capacity that is needed for the tag memory for managing the L2P table cache 31 is also increased.

In general, if the cache line size is increased, a large-capacity cache can be managed even with a tag memory with a small capacity.

However, in the case in which the cache line size was increased, when a cache miss occurred, a great deal of time is needed for cache-line-fill (also called "cache-line-refill") for transferring information from the NAND memory 5 to the cache line of the L2P table cache 31.

In the present embodiment, the device controller 4 divides an enlarged cache line into a plurality of small units (plural sub-lines), and adds to the L2P table cache tag 32 a plurality of bitmap flags indicating whether the plural sub-lines are valid or not. By this configuration, when a cache miss has occurred, it becomes possible to fill, instead of filling the entirety of one cache line of the L2P table cache 31, only a part of this one cache line. Thereby, the cost (cache miss penalty) of cache-line-fill, which is needed when a cache miss occurred, can be minimized. The details of the configuration of the L2P table cache tag 32 including bitmap flags will be described later with reference to FIG. 4 onwards.

The back-end module 14 includes an encoding/decoding unit 141 and a NAND interface 142. The encoding/decoding unit 141 may function, for example, as an error-correction code (ECC) encoder and an ECC decoder. When data is to be written to the NAND memory 5, the encoding/decoding unit 141 encodes the data (data to be written) (FCC encode), thereby adding to this data an error correction code (ECC) as a redundant code. When data was read from the NAND memory 5, the encoding/decoding unit 141 executes error correction of this data by using the ECC that is added to the read data (ECC decode). The encoding/decoding unit 141 executes the ECC encode/decode process in units of data of a predetermined size. An arbitrary size is usable as the size of the unit of data that is to be encoded/decoded by the encoding/decoding unit 141. The size of this unit of data may be, for instance, 512 bytes, 1 Kbytes, 4 Kbytes, or any other size.

Additionally, only one kind of data unit having a certain specified data size may be used as the data unit that is to be encoded/decoded by the encoding/decoding unit 141, or two or more kinds of data units having different data sizes may be used as the data units that are to be encoded/decoded by the encoding/decoding unit 141.

In the case of the former, each of the user data and the physical address information (table data) of the L2P table 7 may be encoded and decoded by the same data size unit. For example, there is a case in which encoding/decoding is executed by the data unit of 1 Kbytes. In this case, in a case of user data of 4 Kbytes, the user data of 4 Kbytes may be obtained by combining four decoded results which are acquired by four-time decoding operations that are executed by the data unit of 1 Kbytes. In a case of table data of a predetermined size (e.g. 512 bytes), half the decoded result acquired by a one-time decoding operation, which is executed by the data unit of 1 Kbytes, may be obtained as the table data of the predetermined size (e.g. 512 bytes).

In the case of the latter, the table data may be encoded and decoded by the data unit corresponding to the data size of this table data. For example, when the table data is 512 bytes, the table data may be encoded and decoded by the data unit of 512 bytes.

Furthermore, the encoding/decoding unit 141 may function as a randomizer (or scrambler). In this case, at a time of data write, the encoding/decoding unit 141 may detect a specific bit pattern in which either "1" or "0" continues for a predetermined bit length from the bit pattern of write data, and may change the detected specific bit pattern to another bit pattern in which "1" or "0" scarcely continues. At a time of data read, the encoding/decoding unit 141 decodes the read data to the original data.

The NAND interface 142 functions as a NAND controller configured to control the NAND memory 5.

The dedicated hardware 15 includes, for instance, a cache tag control logic 151 configured to control the L2P cache tag 32. The cache tag control logic 151 may include, for instance, a circuit configured to determine a cache hit/miss.

Next, the configuration of the host 2 is described.

The host 2 includes a CPU (host CPU) 21, the main memory 22, and a host controller 23. The CPU 21, main memory 22 and host controller 23 are interconnected via a bus 20.

The CPU 21 is a processor which controls the components in the host 2. The CPU 21 executes various programs which are loaded from the storage device 3 or some other storage device into the main memory 22. These programs include an operating system, a file system and various application programs.

The host controller 23 is a controller configured to interface with the storage device 3. Under the control of the file system, the host controller 23 sends a write command and a read command to the storage device 3. In addition, the host controller 23 receives from the storage device 3 a device use area write request which requests data write to the device use area 22B and a device use area read request which requests data read from the device use area 22B.

If the device use area 22B is realized by a UM area, the device use area 22B can be accessed by a UM write request and a UM read request. The UM write request may include a target UM area offset, write data, data length, etc. The target UM area offset is indicative of a target offset address that designates a location in the device use area 22B, which is to be accessed. The host controller 23 may hold a start address (UM base address) of the device use area 22B in the main memory 22. When the UM write request was received, the host controller 23 may calculate an actual memory address by adding a target offset address to the UM base address, and may write the write data in the UM write request to an area beginning from the location corresponding to this memory address.

The UM read request may include a target UM area offset, data length, etc. When the UM read request was received, the host controller 23 calculates an actual memory address by adding a target offset address to the UM base address, reads data from the location corresponding to this memory address, and sends the read data to the storage device 3.

Figure 4:
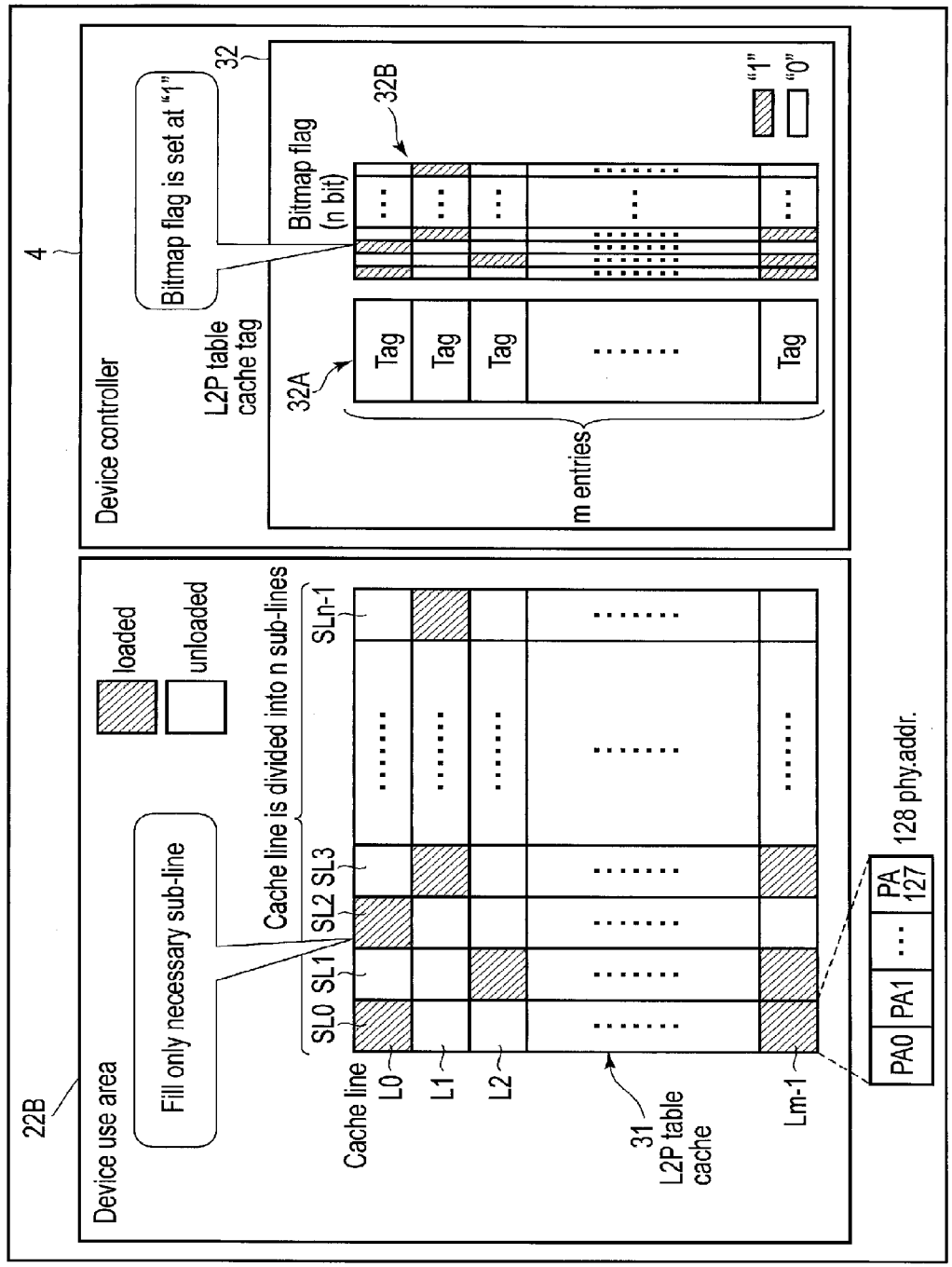
FIG. 4 is a view illustrating the relationship between a logical-to-physical address translation table (L2P table) cache on the memory of a host and an L2P table cache tag within a device controller.

FIG. 4 illustrates the relationship between the L2P table cache 31 on the device use area 22B and the L2P table cache tag 32 in the device controller 4.

The L2P table cache 31 includes a plurality of cache lines L0~Lm−1. Each of the cache lines L0~Lm−1 includes a plurality of sub-lines SL0~SLn−1. Each of the sub-lines SL0~SLn−1 may store the above-described physical address information (table data) of the predetermined size. Specifically, one sub-line may have such a size as to be able to store a plurality of physical addresses corresponding to a plurality of consecutive logical addresses.

For example, the size of one sub-line may be set to be identical to the size of the above-described physical address information (table data) of the predetermined size for reading/writing the L2P table 7. In this case, one sub-line can efficiently be filled by only one-time transfer of table data from the L2P table 7 to the L2P table cache 31.

For example, when the bit width of one physical address is 32 bits (4 bytes) and the sub-line size, that is, the size of one sub-line, is 512 bytes, 128 physical addresses (PA0~PA127) are stored in each sub-line. In general, since the access to the NAND memory 5 has spatial locality, the cache line configuration, in which each cache line includes a plurality of sub-lines each being capable of storing a plurality of physical addresses, makes it possible to increase the hit ratio of the L2P table cache 31.

The size (cache line size) of each of the cache lines L0~Lm−1 is n-times greater than the size of the cache line including only one sub-line. The cache configuration of the L2P table cache 31 including cache lines, which are enlarged n-times, makes it possible to reduce the number (m) of necessary cache lines to 1/n. This means that the number of tags (cache tags), which are necessary for indicating which area of the L2P table is cached in each individual cache line, can be reduced to 1/n.

In the present embodiment, the number (n) of sub-lines included in one cache line can be variably set. The cache line size is expressed by the sub-line size×n. For example, when the sub-line size is 512 bytes, one cache line includes 128×n physical addresses. In this embodiment, the device controller 4 can increase the number (n) of sub-lines to an upper limit value which is set by design.

In the mapping between the L2P table 7 and L2P table cache 31, the L2P table 7 is logically divided into many lines (many areas) each having the same size as the cache line size (sub-line size×n) of the L2P table cache 31. The contents of an m-number of lines (areas) of the many lines (many areas) in the L2P table 7 are cached in the L2P table cache 31.

The L2P table cache 31 may be a direct map cache, a set associative cache, or a full associative cache. In the description below, the case is mainly described in which the L2P table cache 31 is realized as a full associative cache, although the L2P table cache 31 is not restricted to this.

The L2P table cache tag 32 includes an m-number of entries corresponding to the cache lines L0~Lm−1 of the L2P table cache 31. These m-number of entries store an m-number of tags (cache tags) 32A which indicate which area contents of the L2P table 7 are stored in the cache lines L0~Lm−1. Each of the m-number of tags 32A includes address information (upper bit portion of LBA) which is indicative of an area of the L2P table, which is stored in the corresponding cache line.

Each entry of the L2P table cache tag 32 includes a plurality of bitmap flags (n bits) 32B which indicate whether the sub-lines SL0~SLn−1 included in the corresponding cache line are valid or not.

That a sub-line in the cache line is valid means that physical address information (table data of 512 bytes) in the L2P table 7 is actually stored in this sub-line. That a sub-line in the cache line is invalid means that physical address information (table data of 512 bytes) in the L2P table 7 is yet to be transferred to this sub-line.

In the normal cache control, in the cache-line-fill operation, it is necessary to transfer data which corresponds to the entirety of one cache line from the memory to the cache line.

In the present embodiment, since the L2P table cache tag 32 includes the bitmap flag 32B, it is possible to determine a cache hit/miss in units of a sub-line, based on the tag and bitmap flag 32B. Accordingly, when a cache miss occurred, a partial cache-line-fill operation can be executed which transfers only physical address information (e.g. 512-byte table data), which corresponds to a logical address that is to be translated, to a cache line.

In another embodiment, only one physical address may be stored in one sub-line.

When the device controller 4 has received a read request (read command) from the host 2, the device controller 4 executes the following hit/miss determination process by referring to the tags and bitmap flags in the L2P table cache tag 32.

Referring to the L2P table cache tag 32, the device controller 4 determines whether a target cache line, which is associated with a tag including an upper bit portion of the LBA designated by the command received from the host 2, is present in the L2P table cache 31 or not (cache line hit/miss determination). Here, the "target cache line" means a cache line that stores at least a part of an area in the L2P table, which includes desired physical address information (i.e. the physical address information corresponding to this LBA). The "tag including an upper bit portion of the LBA" means a tag including address information which agrees with an upper bit portion (tag field) of the LBA. Hereinafter, the tag including the upper bit portion of the LBA is referred to as "tag agreeing with the upper bit portion (tag field) of the LBA". Further, referring to the bitmap flag corresponding to the target cache line, the controller 4 determines whether the bitmap flag associated with a specific sub-line in the target cache line indicates validity or invalidity (bitmap hit/miss determination). The specific sub-line is a sub-line in which the physical address information corresponding to this LBA is to be stored.

The bitmap hit/miss determination may be executed only when it was determined by the cache line hit/miss determination that the target cache line exists in the L2P table cache 31, or may be executed at the same time as the cache line determination.

If the L2P table cache 31 is the full associative cache, the target cache line is searched by comparing the tag field of the LBA included in the read command with all tags 32A in the L2P table cache tag 32. If the tag agreeing with the tag field of the LBA was searched, the cache line associated with this tag is determined to be the target cache line.

On the other hand, if the L2P table cache 31 is the direct map cache or set associative cache, the tag field of the LBA included in the read command is compared with one tag designated by the index (cache line index) of this LBA. If the tag field of the LBA agrees with this one tag, the cache line associated with this one tag is determined to be the target cache line.

In the bitmap hit/miss determination, the following process is executed.

The case is now assumed in which the cache line L0 was searched as the target cache line.

In this case, the device controller 4 refers to the bitmap flag which is associated with a specific sub-line in the searched cache line L0, and determines whether this bitmap flag indicates validity or invalidity. The "specific sub-line in the searched cache line L0" means the sub-line in which the physical address information, which corresponds to the LBA designated by the command received from the host 2, is to be stored. This sub-line can be specified by the value of this LBA.

If the bitmap flag associated with the specific sub-line is a value indicative of validity (e.g. "1"), it can be determined that the physical address information corresponding to this LBA is stored in this sub-line. On the other hand, if the bitmap flag associated with the specific sub-line is a value indicative of invalidity (e.g. "0"), it can be determined that the physical address information corresponding to this LBA is yet to be loaded in this sub-line.

For example, if the specific sub-line is SL2, the device controller 4 can determine whether the desired physical address exits in the cache line L0 or not, by referring to the bitmap flag that is associated with the sub-line SL2. If the bitmap flag associated with the sub-line SL2 is a value indicative of invalidity (e.g. "0"), the device controller 4 transfers only the physical address information corresponding to this LBA from the L2P table 7 to only the sub-line SL2 of the cache line L0. Thereby, only the sub-line SL2 of the cache line L0 is filled with the physical address information. Then, the device controller 4 updates the bitmap flag associated with the sub-line SL2 to a value indicative of validity (e.g. "1").

In this manner, the cache line L0 is refilled by the sub-line unit (512 bytes). With the passing of time, plural sub-lines of the cache line L0 are gradually filled with physical address information.

Figure 5:
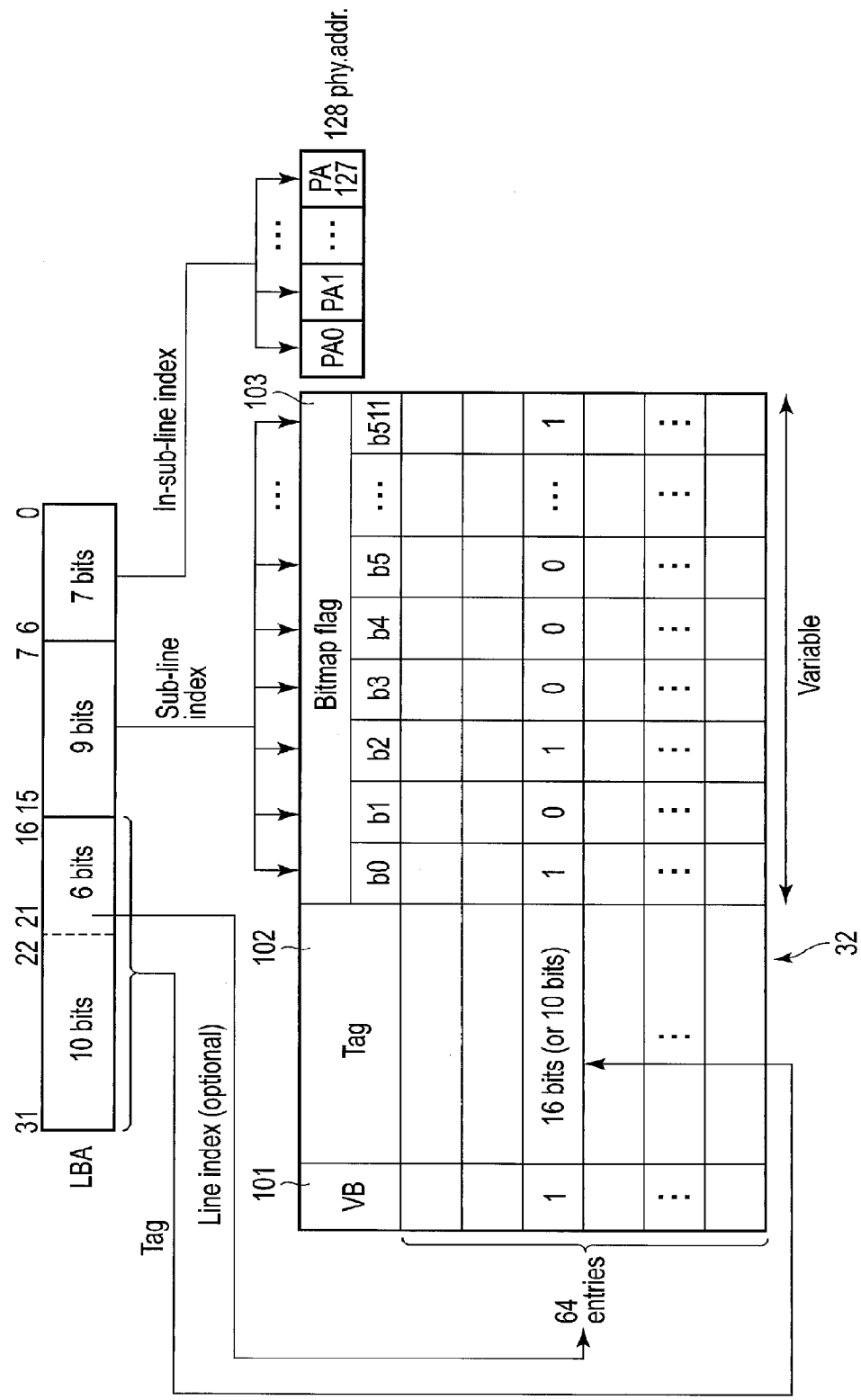
FIG. 5 is a view illustrating a configuration example of the L2P table cache tag.

FIG. 5 illustrates a configuration example of the L2P table cache tag 32.

Here, the case is assumed in which the L2P table cache tag 32 includes 64 entries, that is, the number (m) of cache lines of the L2P table cache 31 is 64.

The 64 entries of the L2P table cache tag 32 correspond to the 64 cache lines of the L2P table cache 31. Each of the 64 entries of the L2P table cache tag 32 may include a valid bit (VB) 101, a tag 102, and a bitmap flag field 103 including a plurality of bitmap flags.

The valid bit (VB) 101 indicates whether the corresponding cache line is valid or not. The "cache line is valid" indicates that this cache line is in an active state, that is, physical address information is stored in at least one sub-line of this cache line.

The LBA, which is used by the host 2 in order to access the storage device 3, is divided into three fields, namely a tag field, a sub-line index, and an in-sub-line index.

The in-sub-line index specifies one of plural physical addresses included in one sub-line. Specifically, the in-sub-line index is used in order to select (designate) one of plural physical addresses stored in the same sub-line. A lower bit portion of the LBA is used as this in-sub-line index. The number of bits (bit width) of the in-sub-line index is determined in accordance with the number of physical addresses included in one sub-line. For example, when the sub-line size is 512 bytes and the physical address has a 32 bit width, 128 physical addresses are stored in each sub-line. Thus, the number of bits (bit width) of the in-sub-line index is 7 bits.

The sub-line index specifies one of n sub-lines included in one cache line. Specifically, the sub-line index is used in order to select (designate) one of n sub-lines stored in the same cache line. For example, when a cache line is enlarged to a cache line size including 512 sub-lines, the number of bits (bit width) of the sub-line index is set at 9 bits. In this case, the bitmap flag field 103 of each entry includes 512 bitmap flags (b0~b511). A bit portion on the upper side of the lower bit portion of the LBA is used as the sub-line index.

In the case of referring to the bitmap flag field 103, one bitmap flag, which is specified by the sub-line index of the logical address, is selected from the 512 bitmap flags.

When the L2P table cache 31 is realized as the full associative cache, a residual upper bit portion (16 bits) excluding the sub-line index and in-sub-line index is used as the tag field. In this case, an upper bit portion (16 bits) of the LBA is stored in the tag 102 of each entry of the L2P table cache tag 32.

When the L2P table cache 31 is realized as the direct map cache or set associative cache, 6 bits on the upper side of the sub-line index are used as the line index for identifying 64 cache lines, and thus the tag field becomes 10 bits. An upper bit portion (10 bits) of the LBA is stored in the tag 102 of each entry of the L2P table cache tag 32.

Specifically, the device controller 4 first allocates the lower bit portion of the LBA as the in-sub-line index for specifying one of the plural physical addresses included in one sub-line. Then, the device controller 4 sets the bit portion for the sub-line index between the upper bit portion of the LBA (the tag field in the full associative cache; the pair of the tag field and line index in the direct map cache/set associative cache) and the lower bit portion of the LBA, and expands the line size of each of the cache lines to a size including plural sub-lines. The number of bits of the upper bit portion is decreased by the number of bits for the sub-line index.

Figure 6:
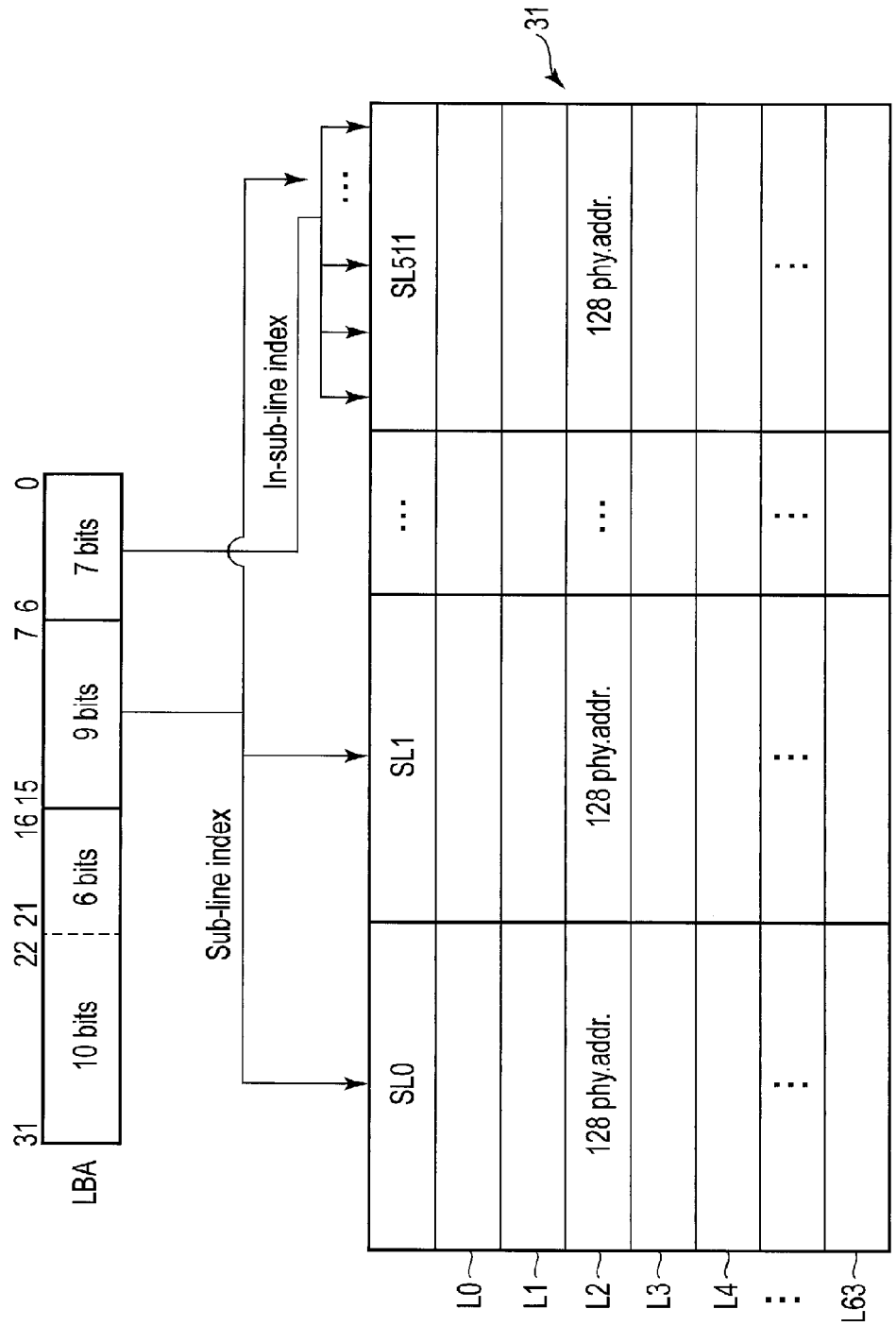
FIG. 6 is a view illustrating a configuration example of the L2P table cache.

FIG. 6 illustrates a configuration of the L2P table cache 31 which corresponds to the L2P table cache tag 32 of FIG. 5.

The L2P table cache 31 includes 64 cache lines L0~L63. Each of the cache lines L0~L63 includes 512 sub-lines SL0~SL511. Each line (each area) of the L2P table 7 is stored in any one of the 64 cache lines L0~L63.

Figure 7:
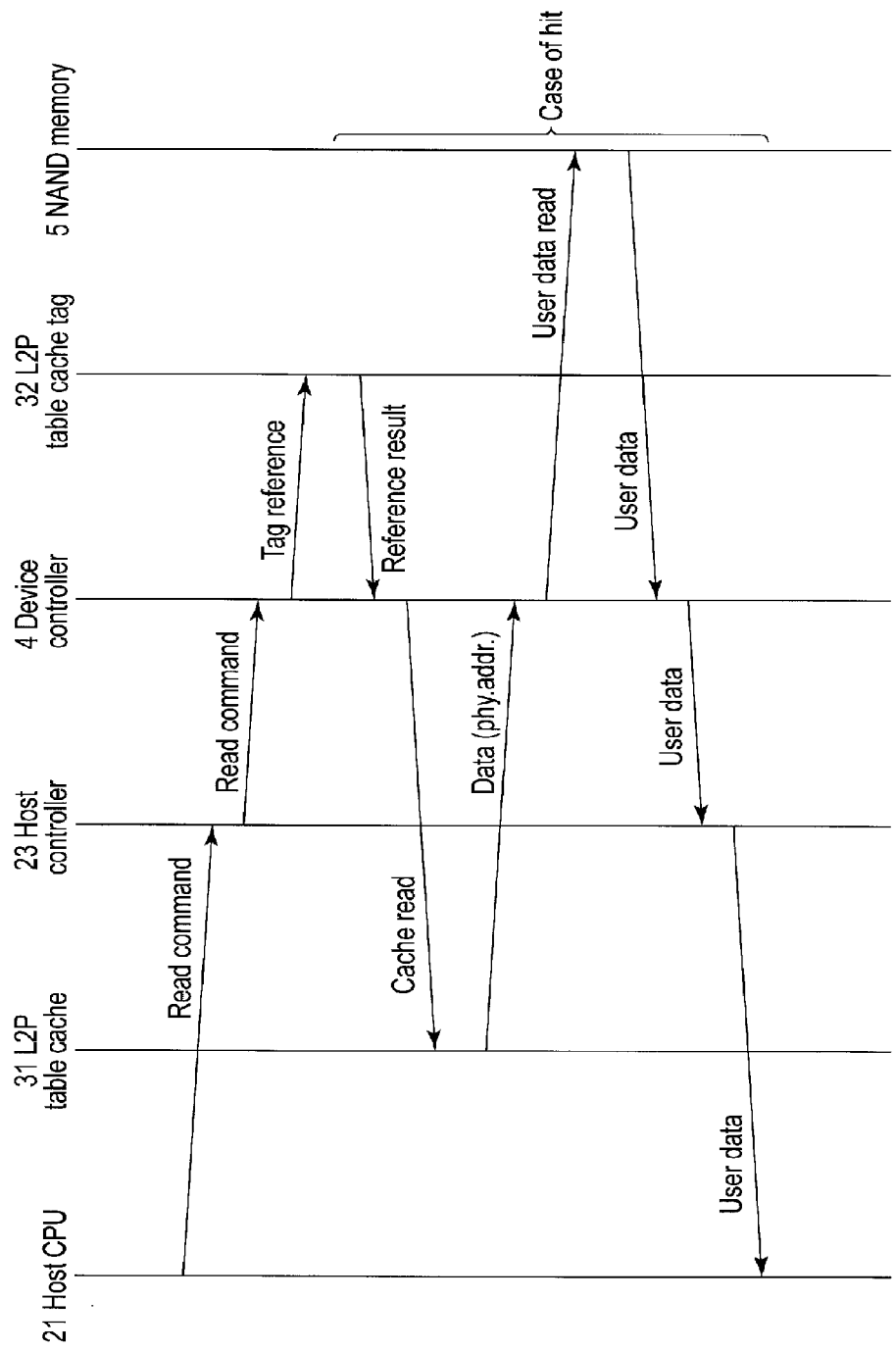
FIG. 7 is a view for explaining a process sequence of a cache control process which is executed by the memory system according to the embodiment at a time of a cache hit.

FIG. 7 illustrates a process sequence of a cache control process which is executed by the device controller 4 in a case of a cache hit in a data read operation.

The host CPU 21 sends a read command to the device controller 4 via the host controller 23. When the device controller 4 has received the read command from the host 2, the device controller 4 refers to the L2P table cache tag 32, thereby determining whether the L2P table cache 31 is in a state of a cache hit, a cache line hit (also called "bitmap miss"), or a cache miss.

The cache hit is the state in which a cache line, which is associated with a tag agreeing with the upper bit portion of the LBA of the read command, is present, and the bitmap flag associated with a sub-line, in which the physical address information corresponding to this LBA is to be stored, is in a state indicative of "valid". Specifically, the cache hit is the state in which the area of the L2P table 7 which includes the desired physical address information is cached in the cache line, and the desired physical address information has already been loaded in this cache line.

The cache line hit (bitmap miss) is the state in which a cache line, which is associated with a tag agreeing with the upper bit portion of the LBA of the read command, is present, but the bitmap flag associated with a sub-line, in which the physical address information corresponding to this LBA is to be stored, is in a state indicative of "invalid". Specifically, the cache line hit (bitmap miss) is the state in which the area of the L2P table 7 which includes the desired physical address information acquired is cached in the cache line, but the desired physical address information has not yet been loaded in this cache line.

The cache miss means the state in which a cache line, which is associated with a tag agreeing with the upper bit portion of the LBA of the read command, is absent.

In the case of a cache hit, the device controller 4 reads the physical address information (table data) corresponding to this LBA from the L2P table cache 31 on the device use area 22B via the host controller 23. Then, the device controller 4 extracts the physical address, which is specified by the value of the in-sub-line index of this LBA, from the physical address information that was read from the L2P table cache 31. Using this physical address, the device controller 4 read-accesses the NAND memory 5, and reads from the NAND memory 5 the user data designated by the LBA in the read command. The device controller 4 sends the user data to the host CPU 21 via the host controller 23.

FIG. 8 illustrates a process sequence of the cache control process which is executed by the device controller 4 in a case of a cache line hit (bitmap miss) in the data read operation.

The host CPU 21 sends a read command to the device controller 4 via the host controller 23. When the device controller 4 has received the read command from the host 2, the device controller 4 refers to the L2P table cache tag 32, thereby determining whether the L2P table cache 31 is in a state of a cache hit, a cache line hit (also called "bitmap miss"), or a cache miss.

In the case of a cache line hit (bitmap miss), the device controller 4 reads the physical address information (table data) corresponding to this LBA from the L2P table 7 of the NAND memory 5. Then, the device controller 4 transfers this physical address information (table data) to a specific sub-line in the cache line that was hit by the cache line hit. This specific sub-line is specified by the value of the sub-line index of this LBA. The physical address information (table data), which is read from the L2P table 7 of the NAND memory 5, is physical address information including the physical address corresponding to this LBA, and having a size corresponding to one sub-line.

The device controller 4 updates the bitmap flag, which is associated with the specific sub-line in the cache line that was hit by the cache line hit, to a value indicative of validity (e.g. "1").

The device controller 4 extracts the physical address specified by the value of the in-sub-line index of this LBA, from the physical address information that was read from the L2P table 7. Using this physical address, the device controller 4 read-accesses the NAND memory 5, and reads from the NAND memory 5 the user data designated by the LBA in the read command. The device controller 4 sends the user data to the host CPU 21 via the host controller 23.

FIG. 9 illustrates a cache-line-fill operation and a bitmap flag update operation, which are executed at the time of a cache line hit (bitmap miss). In FIG. 9, in the cache line, a hatched part indicates a sub-line in which physical address information is already loaded, and a non-hatched part indicates a sub-line in which physical address information is yet to be loaded. In the bitmap flags, a hatched part indicates a bitmap flag which is newly updated.

In FIG. 9, the case is assumed in which a part of the content of the line of the L2P table 7, which corresponds to the LBA of the read command, is present only in the sub-line SL0 (hatched part) of the cache line L1. The device controller 4 refers to the L2P table cache tag 32 and finds a tag agreeing with the tag field of the LBA in the read command, thereby specifying the cache line L1 as the cache line which stores a part of the line of the L2P table 7. Physical address information has not yet been stored in the sub-line SL2 in which physical address information corresponding to the LBA of the read command is to be stored. In this case, the bitmap flag of the sub-line SL2 of the cache line L1 is set at a value indicative of invalidity (e.g. "0"). Accordingly, the device controller 4 can determine a cache line hit (bitmap miss) by referring to the bitmap flag of the sub-line SL2 of the cache line L1.

The device controller 4 reads the desired physical address information from the L2P table 7, and loads this physical address information in the sub-line SL2 of the cache line L1. Then, the device controller 4 updates the bitmap flag of the sub-line SL2 of the cache line L1 from the value indicative of invalidity (e.g. "0") to a value indicative of validity (e.g. "1").

Figure 10:
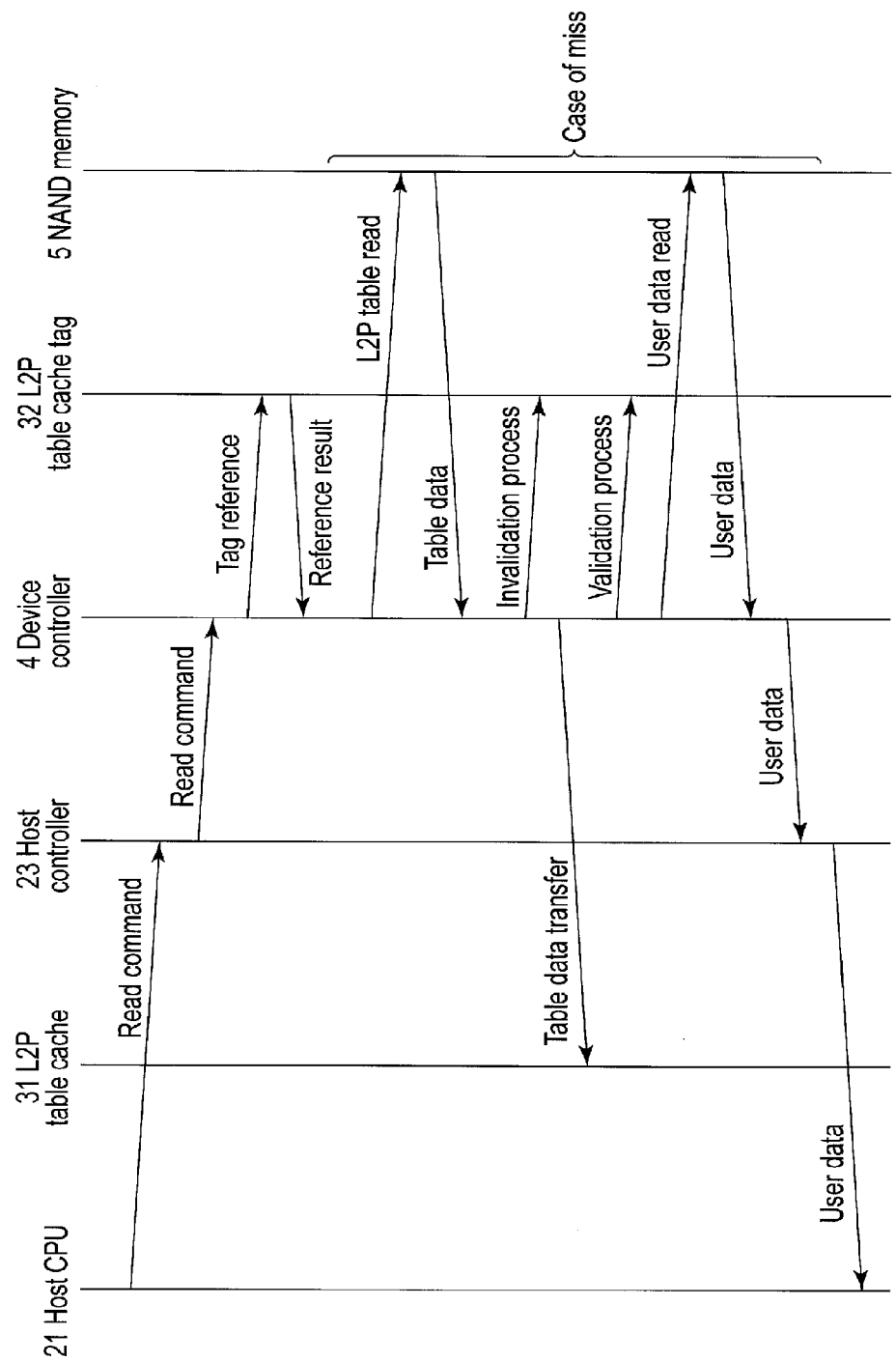
FIG. 10 is a view for explaining a process sequence of a cache control process, which is executed by the memory system according to the embodiment at a time of a cache miss.

FIG. 10 illustrates a process sequence of the cache control process which is executed by the device controller 4 in a case of a cache miss in the data read operation.

The host CPU 21 sends a read command to the device controller 4 via the host controller 23. When the device controller 4 has received the read command from the host 2, the device controller 4 refers to the L2P table cache tag 32, thereby determining whether the L2P table cache 31 is in a state of a cache hit, a cache line hit (also called "bitmap miss"), or a cache miss.

In the case of a cache miss, the device controller 4 reads the physical address information (table data) for one sub-line corresponding to this LBA from the L2P table 7 of the NAND memory 5. If all cache lines of the L2P table cache 31 are valid, that is, if a non-used cache line in which no table data is stored is absent, the device controller 4 selects a cache line, which is to be replaced, from the 64 cache lines of the L2P table cache 31.

The device controller 4 invalidates the selected cache line by updating the entry of the L2P table cache tag 32, which corresponds to the selected cache line.

The device controller 4 transfers the physical address information (table data), which was read from the L2P table 7, to a specific sub-line in the selected cache line in the L2P table cache 31.

The device controller 4 executes a validation process for validating the selected cache line, by updating the entry of the L2P table cache tag 32, which corresponds to the selected cache line.

The device controller 4 extracts the physical address specified by the value of the in-sub-line index of this LBA, from the physical address information that was read from the L2P table 7. Using this physical address, the device controller 4 read-accesses the NAND memory 5, and reads from the NAND memory 5 the user data designated by the LBA in the read command. The device controller 4 sends the user data to the host CPU 21 via the host controller 23.

Figure 11:
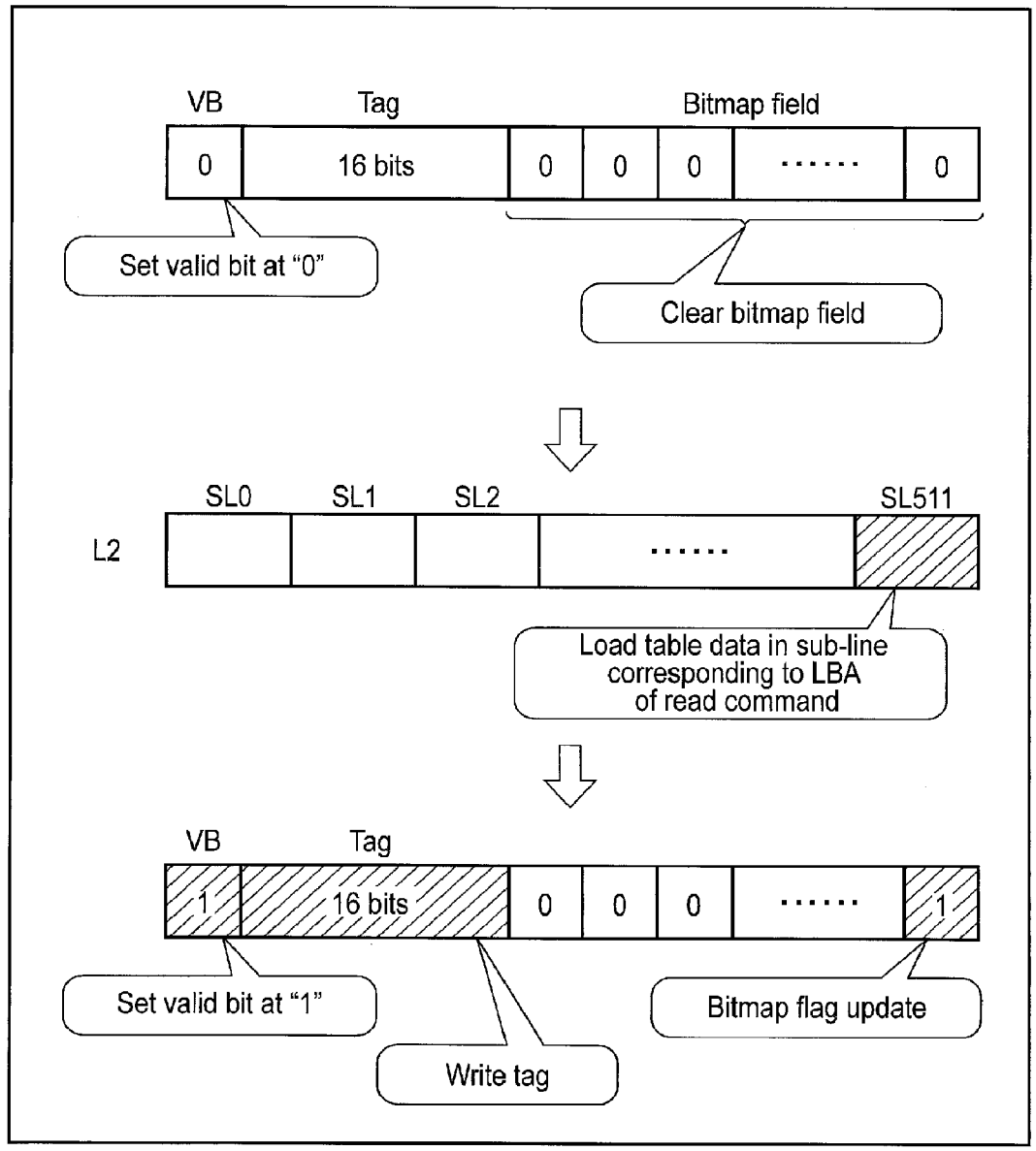
FIG. 11 is a view for explaining a cache line invalidation operation, a cache-line-fill operation and a cache line validation operation, which are executed in the cache control process of FIG. 10.

FIG. 11 illustrates a cache line refill operation and a bitmap flag update operation, which are executed at a time of a cache miss. In FIG. 11, in the cache line, a hatched part indicates a sub-line in which physical address information is already loaded, and a non-hatched part indicates a sub-line in which physical address information is yet to be loaded. In the entry (valid bit VB, tag, bitmap field) of the L2P table cache tag 32, a hatched part indicates a newly updated part.

When a tag agreeing with the tag field of the LBA is not present in the L2P table cache tag 32, the device controller 4 detects the occurrence of a cache miss. The device controller 4 selects a cache line that is to be replaced. Here, the case is assumed in which the cache line L2 was selected as the cache line to be replaced.

The device controller 4 first invalidates the cache line L2. In this case, the device controller 4 clears all bitmap flags, which correspond to the cache line L2, to a value indicative of invalidity (e.g. "0"), and then updates the valid bit, which corresponds to the cache line L2, to a value indicative of invalidity (e.g. "0").

The device controller 4 reads from the L2P table 7 the physical address information for one sub-line corresponding to the LBA, and loads this physical address information in a specific sub-line (e.g. sub-line SL511) of the cache line L2 in which this physical address information is to be stored. In addition, the device controller 4 validates the cache line L2. In this case, the device controller 4 writes in the L2P table cache tag 32 the value of the tag field of the LBA in the read command as the tag corresponding to the selected cache line. Further, the device controller 4 updates the bitmap flag, which is associated with the sub-line SL511 of the cache line L2, to a value indicative of validity (e.g. "1"), and updates the valid bit, which corresponds to the cache line L2, to a value indicative of validity (e.g. "1").

Figure 12:
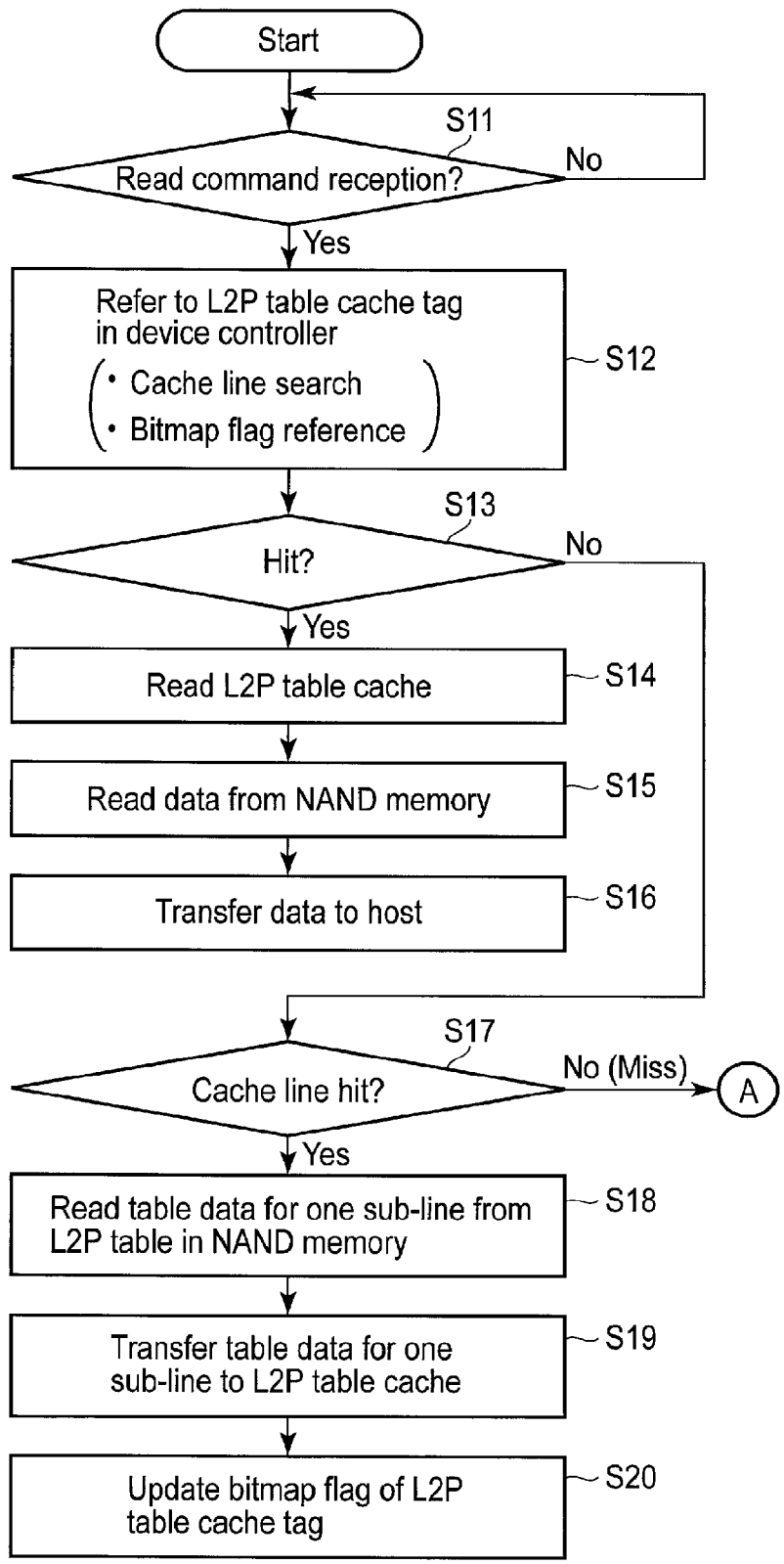
FIG. 12 is a flowchart illustrating a part of the procedure of the cache control process which is executed by the memory system according to the embodiment.

Flowcharts of FIG. 12 and FIG. 13 illustrate the procedure of the cache control process which is executed by the device controller 4.

When the device controller 4 received a read command from the host 2 (YES in step S11), the device controller 4 refers to the L2P table cache tag 32 (step S12).

In step S12, the device controller 4 compares the tag field of the LBA in the read command with each of the 64 tags of the L2P table cache tag 32, thereby searching for a target cache line.

If the target cache line is present in the L2P table cache 31, the device controller 4 selects the bitmap flag, which is associated with a sub-line in which physical address information corresponding to the LBA in the read command is to be stored, from a plurality of bitmap flags corresponding to the searched target cache line, and refers to this selected bitmap flag to determine whether the bitmap flag is valid or not.

If the target cache line exists and the bitmap flag, which was referred to, is indicative of "valid" (Yes in step S13: cache hit), the device controller 4 reads the physical address information (table data for one sub-line) from the L2P table cache 31 on the device use area 22B, by transmitting a UM read request to the host controller 23 (step S14).

The device controller 4 extracts the desired physical address from the read physical address information, and reads user data from the NAND memory 5 by using this extracted physical address (step S15). The device controller 4 transfers the read user data to the host 2 (step S16).

If the target cache line exists but the bitmap flag, which was referred to, is indicative of "invalid" (Yes in step S17: cache line hit), the device controller 4 reads the physical address information (table data for one sub-line) corresponding to the LBA, from the L2P table 7 of the NAND memory 5 (step S18). By transmitting a UM write request to the host controller 23, the device controller 4 transfers the read table data for one sub-line to a specific sub-line of the target cache line of the L2P table cache 31 on the device use area 22B (step S19). The device controller 4 updates the bitmap flag, which corresponds to the specific sub-line of the target cache line, to a value indicative of validity (e.g. "1") (step S20).

If the target cache line itself is not present in the L2P table cache 31 (No in step S17: cache miss), the device controller 4, as illustrated in FIG. 13, reads the physical address information (table data for one sub-line) corresponding to the LBA, from the L2P table 7 of the NAND memory 5 (step S21). The device controller 4 sets the valid bit corresponding to the cache line, which is to be replaced, at a value indicative of invalidity (e.g. "0"), and then clears all bitmap flags, which correspond to all sub-lines of the cache line to be replaced, to a value indicative of invalidity (e.g. "0") (step S22).

By transmitting a UM write request to the host controller 23, the device controller 4 transfers the read table data for one sub-line to a specific sub-line of the cache line, which is to be replaced, of the L2P table cache 31 on the device use area 22B (step S23).

The device controller 4 sets the valid bit, which corresponds to the cache line to which the table data for one sub-line was transferred, at a value indicative of validity (e.g. "1") (step S24), and then sets the bitmap flag, which corresponds to the specific sub-line of this cache line, at a value indicative of validity (e.g. "1") (step S25).

Here, although the flowcharts of FIG. 12 and FIG. 13 illustrate the cache control process which is executed at the time of data read, the procedure of the cache control process of this embodiment is also applicable to the read-modified-write process for updating the L2P table 7.

The case is now assumed in which data was written in the NAND memory by execution of a write command including a certain LBA, and thereby a need occurred to update a part of table data for a certain sub-line in the L2P table 7.

If the table data of an update target corresponding to this LBA is cached in the L2P table cache 31 (cache hit), the device controller 4 reads this table data from the cache line that was hit in the L2P table cache 31. The device controller 4 updates a part of the read table data, and writes the updated table data to the L2P table 7. Further, the device controller 4 writes the updated table data to the specific sub-line of the hit cache line, and sets this cache line in the latest state.

If the cache line, in which the table data of the update target is cached, exists in the L2P table cache 31 but the table data of the update target is not stored in this cache line (cache line hit), the device controller 4 reads this table data from the L2P table 7. Then, the device controller 4 updates a part of this table data, and writes the updated table data to the L2P table 7. Further, the device controller 4 writes the updated table data to the specific sub-line of the cache line that was hit by the cache line hit, and sets this cache line in the latest state.

FIG. 14 illustrates a configuration example of the L2P table cache tag 32 in which the number of sublines is 4096.

When the capacity of the NAND memory 5 is 128 Gbytes, as described above, the capacity of the L2P table 7 is about 128 Mbytes. If the device use area 22B of 128 Mbytes or more can be secured, the L2P table cache 31 having the capacity of 128 Mbytes can be placed on the device use area 22B.

In this case, as illustrated in FIG. 14, by changing (setting) the number of bits (bit width) for the sub-line index to 12 bits, the device controller 4 sets 4096 bitmap flags for each of 64 entries of the L2P table cache tag 32. Thereby, one cache line can be expanded to a size including 4096 sub-lines. In this case, the size of one cache line becomes 4 Mbytes. Accordingly, the capacity of the L2P table cache 31 becomes 128 Mbytes (64×4 Mbytes).

When the size of the secured (allocated) device use area 22B is less than 128 Mbytes, the number of bits for the sub-line index may be reduced to a bit number which is less than 12 bits.

Figure 15:
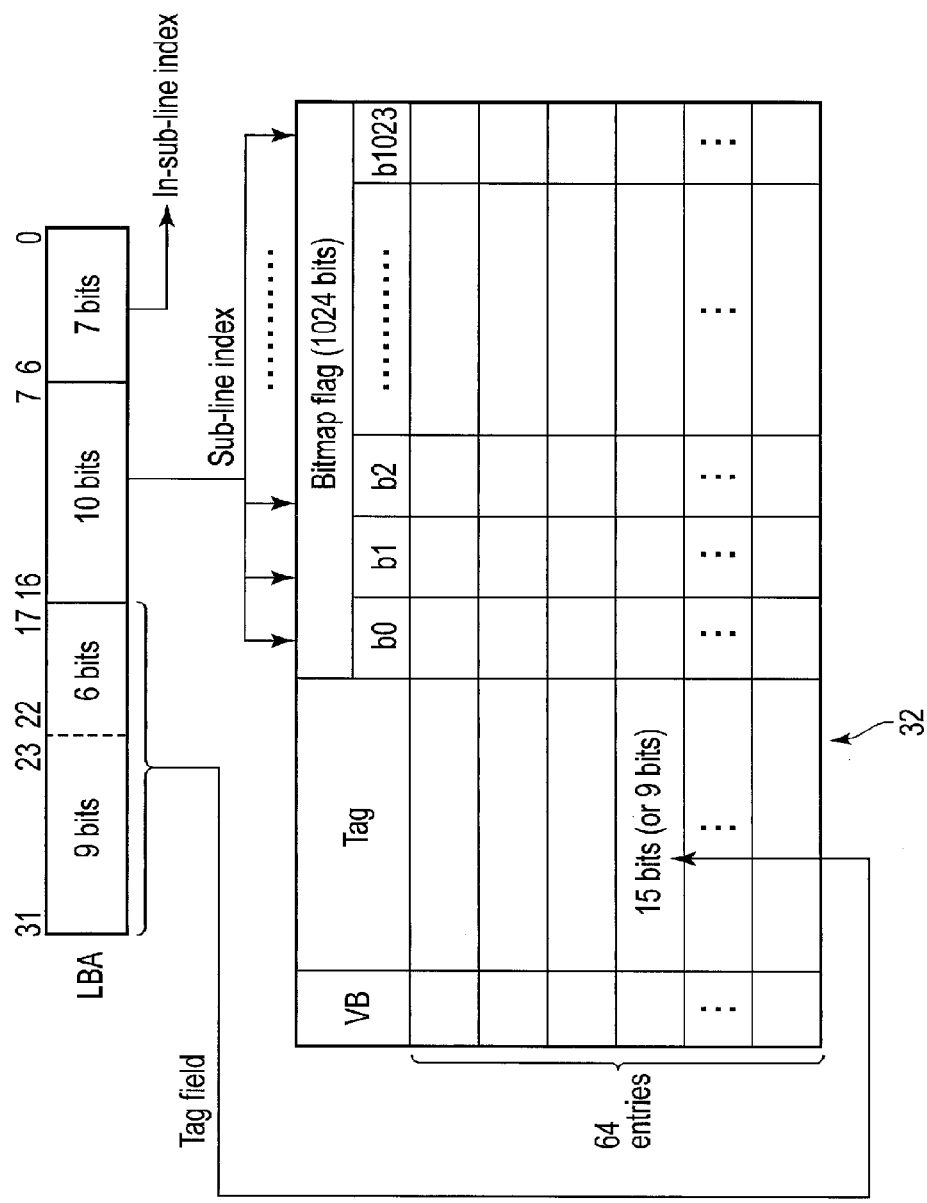
FIG. 15 is a view illustrating a configuration example of the L2P table cache in which the number of sub-lines included in the cache line is set at 1024 by adjusting the number of bits for the subline index.

FIG. 15 illustrates a configuration example of the L2P table cache tag 32 in which the number of sublines is 1024.

As illustrated in FIG. 15, by changing the number of bits for the sub-line index to 10 bits, the device controller 4 sets 1024 bitmap flags for each of 64 entries of the L2P table cache tag 32. Thereby, one cache line can be set to a size including 1024 sub-lines.

Figure 16:
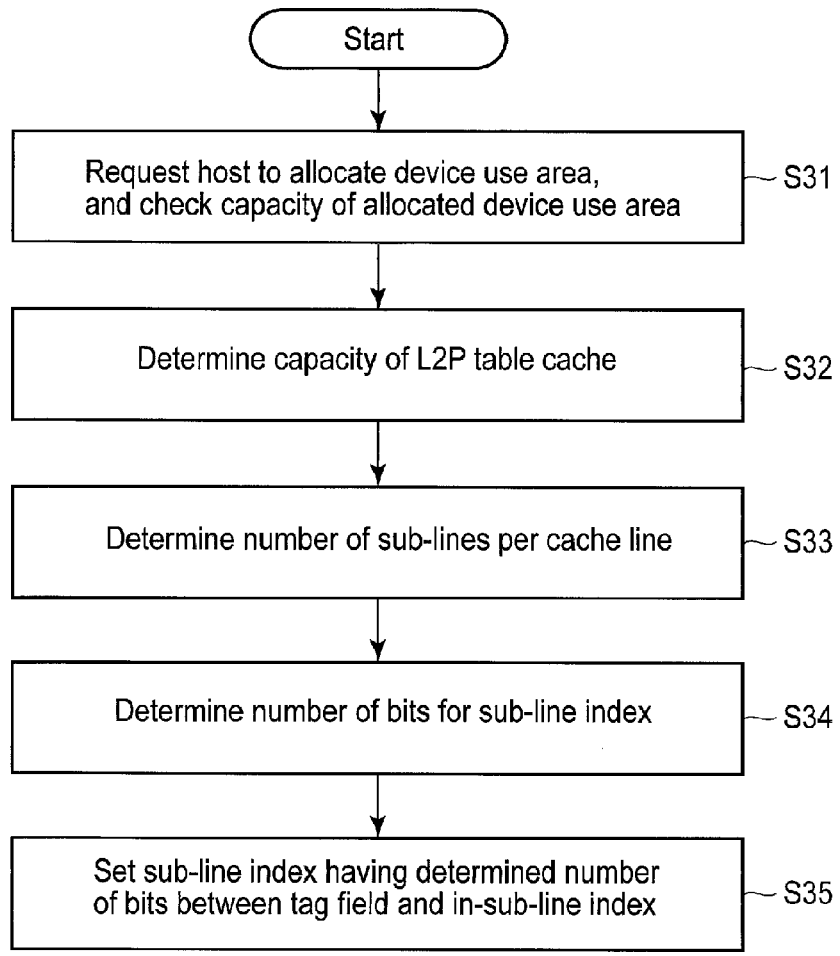
FIG. 16 is a flowchart illustrating the procedure of a cache setup process which is executed by the memory system according to the embodiment.

A flowchart of FIG. 16 illustrates the procedure of a cache setup process which is executed by the device controller 4.

The device controller 4 requests the host 2 to allocate the device use area 22B, and checks the capacity of the allocated device use area 22B, based on the size of the allocated device use area 22B which is reported from the host 2 (step S31). The device controller 4 determines the capacity of the L2P table cache 31 which is disposed on the memory 22 of the host 2, based on the capacity of the allocated device use area 22B and the capacity of the NAND memory 5 (step S32). If the capacity of the allocated device use area 22B is not less than 1/1000 of the capacity of the NAND memory 5, the capacity of the L2P table cache 31 may be determined to be 1/1000 of the capacity of the NAND memory 5. If the capacity of the allocated device use area 22B is less than 1/1000 of the capacity of the NAND memory 5, the capacity of the L2P table cache 31 may be determined based on the capacity of the allocated device use area 22B.

Figure 17:
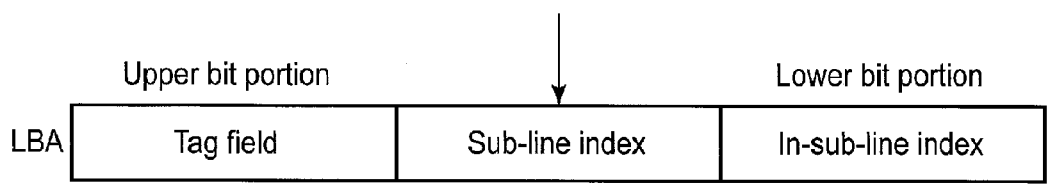
FIG. 17 is a view for explaining a sub-line index setup process which is executed by the memory system according to the embodiment.

The device controller 4 determines the number of sub-lines per cache line, based on the capacity of the L2P table cache 31 (step S33). The device controller 4 determines the number of bits which are to be allocated to the sub-line index, from the number of sub-lines per cache line (step S34). As illustrated in FIG. 17, the device controller 4 sets the sub-line index having the determined number of bits between the lower bit portion (in-sub-line index) of the LBA for designating the user data and the upper bit portion (tag field) (step S35). The bit number of the tag field can be obtained by subtracting the number of bits of the in-sub-line index and the number of bits of the sub-line index from the bit width of the LBA.

As has been described above, according to the present embodiment, since the L2P table cache tag 32 includes the bitmap flags 32B, the cache hit/cache line hit (bitmap miss)/cache miss can be determined based on the tags and bitmap flags 32B. Accordingly, when a cache line hit (bitmap miss)/cache miss has occurred, such a partial cache-line-fill operation can be executed that only necessary physical address information is transferred to only one sub-line in a cache line. Thus, although each cache line is expanded to a size having a plurality of sub-lines, it is possible to minimize the cost (cache miss penalty) of cache-line-fill, which is needed when a cache line hit (bitmap miss)/cache miss occurred. Therefore, without causing an increase in amount of tags which need to be held within the device controller 4, the L2P table cache 31 of a large capacity, which is placed on the device use area 22B of the host 2, can efficiently be managed.

Moreover, the device controller 4 can flexibly change the number of sub-lines (number of bitmap flags) which are to be included in each cache line, in accordance with the capacity of the allocated device use area 22B, etc.

In the meantime, in the present embodiment, the NAND memory is illustrated as the nonvolatile memory. However, the functions of this embodiment are also applicable to various other nonvolatile memories such as a three-dimensional flash memory, an MRAM (Magnetoresistive Random Access Memory), a PRAM (Phase change Random Access Memory), an ReRAM (Resistive Random Access Memory), or an FeRAM (Ferroelectric Random Access Memory).

In addition, in the present embodiment, as regards the values of bitmap flags, the case was described in which "1" is used as a value indicating that a sub-line is valid, and "0" is used a value indicating that a sub-line is invalid. However, arbitrary values, which can distinguish whether the sub-line is valid or invalid, can be used as the values of bitmap flags. For example, the value indicating that a sub-line is valid may be "0", and the value indicating that a sub-line is invalid may be "1". Similarly, as regards the valid bit, arbitrary values, which can distinguish whether the cache line is valid or invalid, can be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, comprising:
   a nonvolatile memory;
   a device controller configured to control the nonvolatile memory and to store a part of a logical-to-physical address translation table (L2P table) stored in the nonvolatile memory in a memory of the host as a cache; and
   a tag memory including a plurality of entries, each of the plurality of entries being associated with each of a plurality of cache lines of the cache, each of the entries including a tag and a plurality of bitmap flags, the tag indicating which area of the L2P table is stored in a corresponding cache line, each of the plurality of bitmap flags corresponding to each of a plurality of sub-lines included in the corresponding cache line, each of the bitmap flags indicating whether a corresponding sub-line is valid or not, wherein the device controller is configured to:

determine, by referring to the tag memory, whether a first cache line, which is associated with a tag including an upper bit portion of a first logical address designated by a command received from the host, is present in the cache or not, and whether a first bitmap flag, which is associated with a first sub-line in the first cache line, indicates validity or not, the first sub-line being a sub-line in which first physical address information corresponding to the first logical address is to be stored;

read, when the first cache line is present in the cache and the first bitmap flag indicates validity, the first physical address information from the first sub-line of the first cache line; and invalidate, when the first cache line is absent in the cache and a non-used cache line is absent in the plurality of cache lines, a second cache line included in the cache, read the first physical address information from the L2P table of the nonvolatile memory, transfer the read first physical address information to a second sub-line of the second cache line to partly fill the second cache line, and update a bitmap flag associated with the second sub-line to a value indicative of validity, wherein the second sub-line is a sub-line in which the first physical address information is to be stored.

2. The memory system of claim 1, wherein the device controller is configured to read, when the first cache line is present in the cache and the first bitmap flag indicates invalidity, the first physical address information from the L2P table of the nonvolatile memory, transfer the read first physical address information to the first sub-line of the first cache line to partly fill the first cache line, and update the first bitmap flag to a value indicative of validity.

3. The memory system of claim 1, wherein the device controller is configured to update all bitmap flags corresponding to the second cache line to values indicative of invalidity to invalidate the second cache line.

4. The memory system of claim 1, wherein the device controller is configured to read, when the first cache line is present in the cache and the first bitmap flag indicates invalidity, physical address information including a physical address corresponding to the first logical address and having a size corresponding to one sub-line, from the L2P table of the nonvolatile memory as the first physical address information.

5. The memory system of claim 1, wherein each of the plurality of sub-lines has such a size as to be able to store a plurality of physical addresses corresponding to a plurality of consecutive logical addresses.

6. The memory system of claim 1, wherein the device controller is configured to transfer, when the first cache line is present in the cache and the first bitmap flag indicates invalidity, only the first physical address information, which was read from the L2P table of the nonvolatile memory, to the first sub-line of the first cache line, and fill only the first sub-line of the first cache line with the first physical address information.

7. The memory system of claim 1, wherein the device controller is configured to:

allocate a lower bit portion of a logical address, which is used by the host, as an in-sub-line index for specifying one of a plurality of physical addresses included in one sub-line; and set a sub-line index for specifying one of the plurality of sub-lines between the lower bit portion of the logical address and an upper bit portion of the logical address to expand a line size of each of the plurality of cache lines to a size including the plurality of sub-lines.

8. The memory system of claim 7, wherein the device controller is configured to:

determine a number of sub-lines which are included in each of the plurality of cache lines, based on a capacity of the cache placed on the memory of the host; and set a bit portion for the sub-line index, which has a number of bits corresponding to the determined number of sub-lines, between the lower bit portion and the upper bit portion.

9. The memory system of claim 7, wherein the cache is placed on a device use area allocated to the memory of the host, and the device controller is configured to:

determine a capacity of the cache, based on a capacity of the device use area and a capacity of the nonvolatile memory;

determine a number of sub-lines which are to be included in each of the plurality of cache lines, based on the determined capacity of the cache; and set a bit portion for the sub-line index, which has a number of bits corresponding to the determined number of sub-lines, between the lower bit portion and the upper bit portion.

10. An information processing system comprising a host and a memory system connectable to the host, the host comprising:

a host controller connectable to the memory system; and a memory, and the memory system comprising:

a nonvolatile memory;

a device controller configured to control the nonvolatile memory and to store a part of a logical-to-physical address translation table (L2P table) stored in the nonvolatile memory in the memory of the host as a cache; and a tag memory including a plurality of entries, each of the plurality of entries being associated with each of a plurality of cache lines of the cache, each of the entries including a tag and a plurality of bitmap flags, the tag indicating which area of the L2P table is stored in a corresponding cache line, each of the plurality of bitmap flags corresponding to each of a plurality of sub-lines included in the corresponding cache line, each of the bitmap flags indicating whether a corresponding sub-line is valid or not, wherein the device controller is configured to:

determine, by referring to the tag memory, whether a first cache line, which is associated with a tag including an upper bit portion of a first logical address designated by a command received from the host, is present in the cache or not, and whether a first bitmap flag, which is associated with a first sub-line in the first cache line, indicates validity or not, wherein the first sub-line is a sub-line in which first physical address information corresponding to the first logical address is to be stored;

read, when the first cache line is present in the cache and the first bitmap flag indicates validity, the first physical address information from the first sub-line of the first cache line via the host controller, when the first cache line is present in the cache and the first bitmap flag indicates validity, and invalidate, when the first cache line is absent in the cache and a non-used cache line is absent in the plurality of cache lines, a second cache line included in the cache, read the first physical address information from the L2P table of the nonvolatile memory, transfer, via the host controller, the first physical address information to a second sub-line of the second cache line to partly fill the second cache line, and update a bitmap flag associated with the second sub-line to a value indicative of validity, wherein the second sub-line is a sub-line in which the first physical address information is to be stored.

11. The information processing system of claim 10, wherein the device controller is configured to read, when the first cache line is present in the cache and the first bitmap flag indicates invalidity, the first physical address information from the L2P table of the nonvolatile memory, transfer the read first physical address information to the first sub-line of the first cache line via the host controller to partly fill the first cache line, and update the first bitmap flag to a value indicative of validity.

12. The information processing system of claim 10, wherein the device controller is configured to update all bitmap flags corresponding to the second cache line to values indicative of invalidity to invalidate the second cache line.

13. The information processing system of claim 10, wherein the device controller is configured to read, when the first cache line is present in the cache and the first bitmap flag indicates invalidity, physical address information including a physical address corresponding to the first logical address and having a size corresponding to one sub-line, from the L2P table of the nonvolatile memory as the first physical address information.

14. The information processing system of claim 10, wherein the device controller is configured to transfer, when the first cache line is present in the cache and the first bitmap flag indicates invalidity, only the first physical address information, which was read from the L2P table of the nonvolatile memory, to the first sub-line of the first cache line, and fill only the first sub-line of the first cache line with the first physical address information.

15. A method of controlling a memory system, the memory system connectable to a host including a memory, the memory system including a nonvolatile memory in which a logical-to-physical address translation table (L2P table) is stored, the method comprising:
storing a part of the L2P table in the memory of the host as a cache;
managing a tag memory, the tag memory including a plurality of entries, each of the plurality of entries being associated with each of a plurality of cache lines of the cache, each of the entries including a tag and a plurality of bitmap flags, the tag indicating which area of the L2P table is stored in a corresponding cache line, each of the plurality of bitmap flags corresponding to each of a plurality of sub-lines included in the corresponding cache line, each of the bitmap flags indicating whether a corresponding sub-line is valid or not;
determining, by referring to the tag memory, whether a first cache line, which is associated with a tag including an upper bit portion of a first logical address designated by a command received from the host, is present in the cache or not, and whether a first bitmap flag, which is associated with a first sub-line in the first cache line, indicates validity or not, the first sub-line being a sub-line in which first physical address information corresponding to the first logical address is to be stored;
reading, when the first cache line is present in the cache and the first bitmap flag indicates validity, the first physical address information from the first sub-line of the first cache line; and
invalidating, when the first cache line is absent in the cache and a non-used cache line is absent in the plurality of cache lines, a second cache line included in the cache, reading the first physical address information from the L2P table of the nonvolatile memory, transferring the read first physical address information to a second sub-line of the second cache line to partly fill the second cache line, and updating a bitmap flag associated with the second sub-line to a value indicative of validity, the second sub-line being a sub-line in which the first physical address information is to be stored.

16. The method of claim 15, further comprising
reading, when the first cache line is present in the cache and the first bitmap flag indicates invalidity, the first physical address information from the L2P table of the nonvolatile memory, transferring the read first physical address information to the first sub-line of the first cache line to partly fill the first cache line, and updating the first bitmap flag to a value indicative of validity.

17. The method of claim 15, further comprising
updating all bitmap flags corresponding to the second cache line to values indicative of invalidity to invalidate the second cache line.

18. The method of claim 15, further comprising
reading, when the first cache line is present in the cache and the first bitmap flag indicates invalidity, physical address information including a physical address corresponding to the first logical address and having a size corresponding to one sub-line, from the L2P table of the nonvolatile memory as the first physical address information.

19. The method of claim 15, wherein each of the plurality of sub-lines has such a size as to be able to store a plurality of physical addresses corresponding to a plurality of consecutive logical addresses.

20. The method of claim 15, further comprising:
transferring, when the first cache line is present in the cache and the first bitmap flag indicates invalidity, only the first physical address information, which was read from the L2P table of the nonvolatile memory, to the first sub-line of the first cache line; and
filling only the first sub-line of the first cache line with the first physical address information.

* * * * *